(12) United States Patent
Abe et al.

(10) Patent No.: US 8,177,007 B2
(45) Date of Patent: May 15, 2012

(54) POWER UNIT

(75) Inventors: Noriyuki Abe, Saitama-ken (JP); Yasuo Kitami, Saitama-ken (JP); Shigemitsu Akutsu, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 372 days.

(21) Appl. No.: 12/153,579

(22) Filed: May 21, 2008

(65) Prior Publication Data
US 2009/0038866 A1    Feb. 12, 2009

(30) Foreign Application Priority Data
May 23, 2007   (JP) ................. 2007-137172

(51) Int. Cl.
*B60W 20/00*   (2006.01)
(52) U.S. Cl. ............................ 180/65.285; 180/65.265
(58) Field of Classification Search ............ 180/65.285, 180/65.31, 65.6, 65.24, 242, 243
See application file for complete search history.

(56) References Cited

U.S. PATENT DOCUMENTS

| | | | |
|---|---|---|---|
| 5,443,130 A * | 8/1995 | Tanaka et al. ............. 180/65.6 |
| 6,371,878 B1 * | 4/2002 | Bowen ....................... 475/5 |
| 6,441,506 B2 * | 8/2002 | Nakashima ................ 290/40 C |
| 6,573,745 B2 * | 6/2003 | Raftari et al. ............. 324/772 |
| 6,691,809 B2 * | 2/2004 | Hata et al. ................ 180/65.225 |
| 6,732,526 B2 * | 5/2004 | Minagawa et al. ........... 60/706 |
| 7,140,461 B2 * | 11/2006 | Morrow .................... 180/65.245 |
| 7,195,087 B2 * | 3/2007 | Hatsuda et al. ............ 180/65.285 |
| 7,204,776 B2 * | 4/2007 | Minagawa et al. ............. 475/5 |
| 7,238,132 B2 * | 7/2007 | Sowul et al. .................. 475/5 |
| 7,384,357 B2 * | 6/2008 | Thomas et al. ................ 475/5 |
| 7,395,889 B2 * | 7/2008 | Sugiyama et al. ....... 180/65.285 |

(Continued)

FOREIGN PATENT DOCUMENTS

| | | |
|---|---|---|
| JP | 11-091524 | 4/1999 |
| JP | 2005-295771 | 10/2005 |
| JP | 2006-046639 | 2/2006 |
| JP | 2006-136066 | 5/2006 |
| JP | 2007-010093 | 1/2007 |
| JP | 2007-057066 | 3/2007 |
| WO | 03/075437 | 9/2003 |
| WO | 2005/110790 | 11/2005 |

OTHER PUBLICATIONS

Supplemental European Search Report, Application No. EP 08 75 2518, Apr. 26, 2010, a total of 3 pages.

*Primary Examiner* — Jeffrey J Restifo
(74) *Attorney, Agent, or Firm* — Squire Sanders (US) LLP

(57) ABSTRACT

A power unit which makes it possible to attain the reduction of the size and manufacturing costs thereof, and improve turnability. A power unit drives left and right rear wheels. A first rotating machine and a second rotating machine are configured to be capable of inputting and outputting energy. A first and a second planetary gear units are disposed between the first and second rotating machines and the left and right rear wheels, respectively, for transmitting energy between the first rotating machine and the left and right rear wheels and between the second rotating machine and the same. The first rotating machine, the left rear wheel, the right rear wheel, and the second rotating machine are in a collinear relationship in rotational speed, and are in a line in this order in a collinear chart representing the collinear relationship.

9 Claims, 26 Drawing Sheets

U.S. PATENT DOCUMENTS

| | | | |
|---|---|---|---|
| 7,591,339 B2 * | 9/2009 | Sugimoto et al. | 180/242 |
| 7,610,976 B2 * | 11/2009 | Holmes et al. | 180/65.29 |
| 7,624,828 B2 * | 12/2009 | Kozarekar | 180/65.6 |
| 7,625,307 B2 * | 12/2009 | Usoro | 475/5 |
| 2005/0218738 A1 | 10/2005 | Hsu | |
| 2005/0284683 A1 * | 12/2005 | Matsuda | 180/242 |
| 2006/0015236 A1 * | 1/2006 | Yamaguchi et al. | 701/69 |
| 2006/0247081 A1 | 11/2006 | Yamauchi | |
| 2008/0185199 A1 * | 8/2008 | Kimura et al. | 180/65.2 |
| 2009/0247341 A1 * | 10/2009 | Abe et al. | 475/5 |
| 2009/0250280 A1 * | 10/2009 | Abe et al. | 180/65.285 |
| 2009/0301799 A1 * | 12/2009 | Tarasinski et al. | 180/65.22 |

* cited by examiner

F I G. 4 A
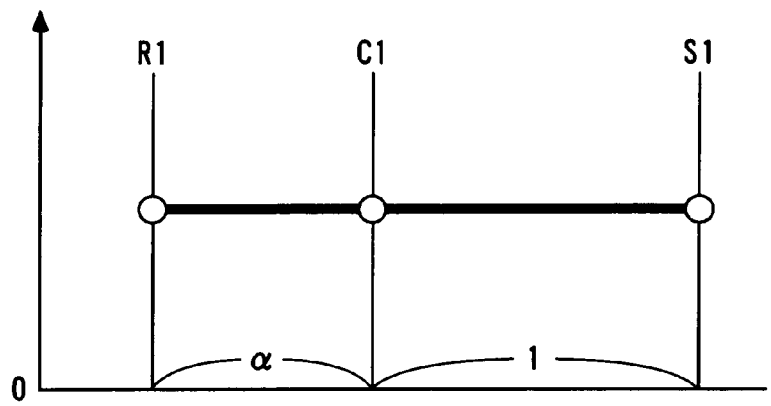
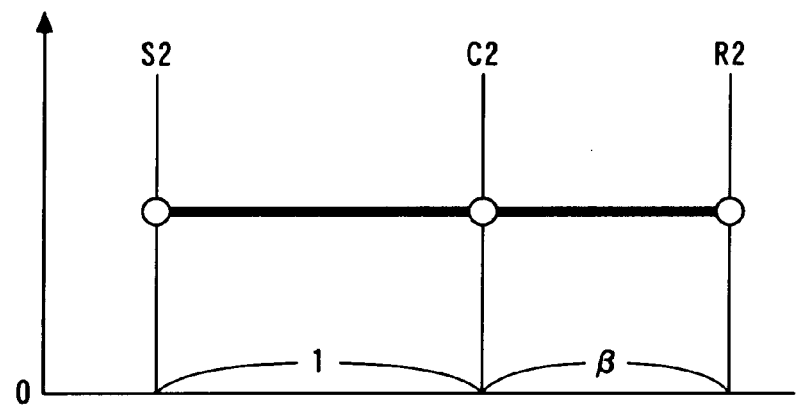
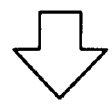
F I G. 4 B
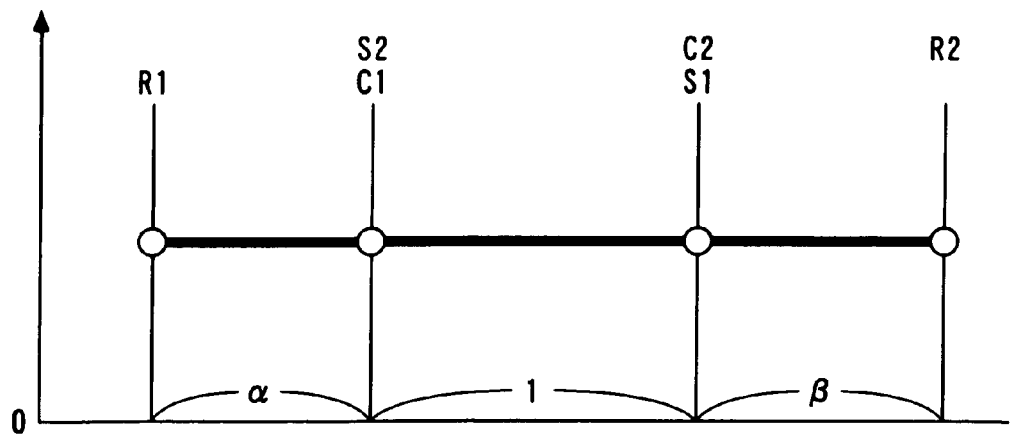

FIG. 14A
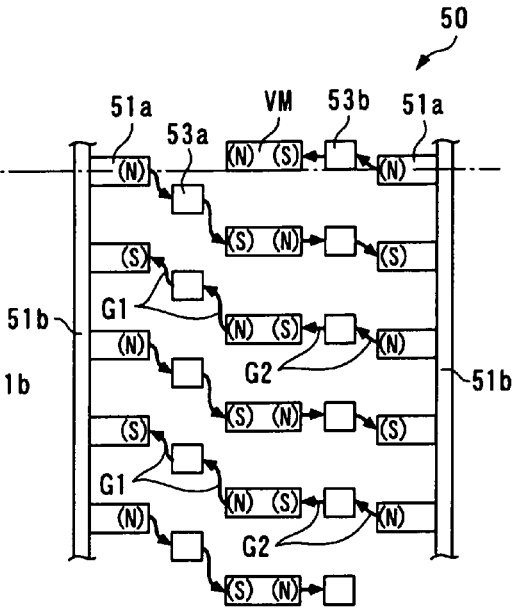
FIG. 14B
FIG. 14C
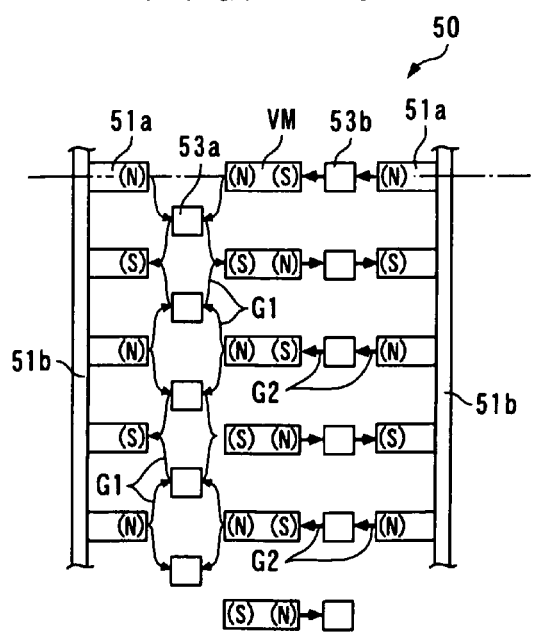

F I G. 1 6
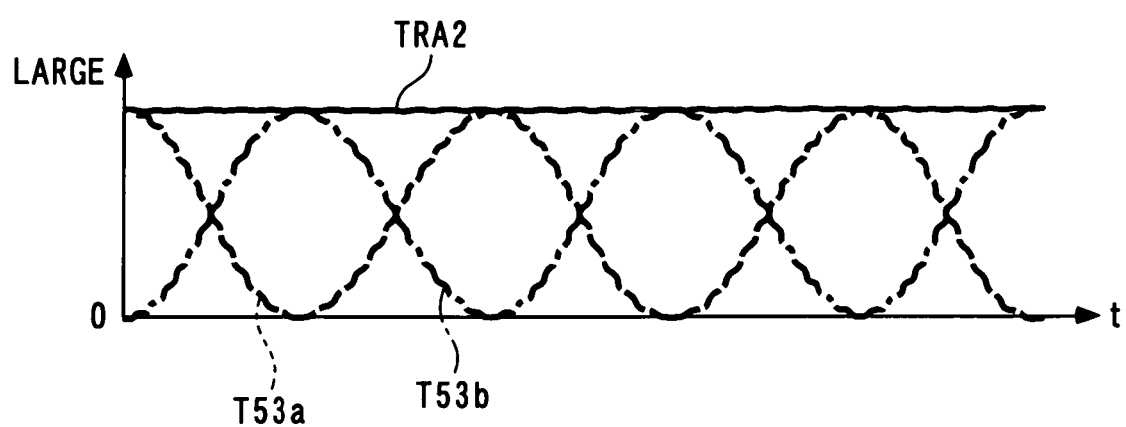

POWER UNIT

BACKGROUND OF THE INVENTION

1. Field of the Invention

The present invention relates to a power unit for driving left and driven parts for propelling a transport machine in a manner capable of traveling forward in a straight line or in a manner capable of turning.

2. Description of the Related Art

Conventionally, as a power unit of this kind, one disclosed e.g. in Japanese Laid-Open Patent Publication (Kokai) No. H11-91524 is known. This power unit is for driving left and right drive wheels of a vehicle, and is provided with first and second planetary gear units, first and second electric motors, and brakes. The first planetary gear unit has a sun gear and a carrier thereof connected to a first electric motor and the left drive wheel, respectively, and the second planetary gear unit has a sun gear and a carrier thereof connected a second electric motor and the right drive wheel, respectively. Further, the first planetary gear unit and the second planetary gear unit have respective ring gears connected to each other, and each of the aforementioned brakes holds the associated ring gear unrotatable when it is on, and permits the rotation thereof when it is off.

In the conventional power unit, by turning on the brakes, the ring gears are held unrotatable, and at the same time, the first and second electric motors are caused to rotate normally or inversely together with the respective associated sun gears, whereby the left and right drive wheels are rotated normally or inversely together with the respective associated carriers, which causes the vehicle to move forward or rearward. Further, by turning off the brake to permit the rotations of the ring gears, causing the first electric motor to rotate normally and causing the second electric motor to turn inversely, the speed of the left drive wheel is increased with reference to the rotational speed of the ring gear, and the speed of the right drive wheel is reduced, whereby a right turn of the vehicle is assisted. Further, in the above situation, by causing the first electric motor to rotate inversely and the second electric motor to rotate normally, a left turn of the vehicle is assisted.

However, as described hereinabove, in the conventional power unit, the brakes are indispensable for causing the vehicle to move forward or rearward. Therefore, the provision of the brakes results in an increased size of the power unit and increased manufacturing costs of the same.

SUMMARY OF THE INVENTION

It is an object of the present invention to provide a power unit which makes it possible to attain the reduction of the size and manufacturing costs thereof, and improve the turnability of a transport machine.

To attain the above object, the present invention provides a power unit that drives left and right driven parts for propelling a transport machine such that the transport machine in a manner capable of travelling in a line and turning, comprising a first energy input and output device configured to be capable of inputting and outputting energy, a second energy input and output device configured to be capable of inputting and outputting energy, and an energy transmission device provided between the first energy input and output device and the second energy input and output device, and the left and right driven parts, for transmitting energy between the first energy input and output device and the left and right driven parts, and between the second energy input and output device and the left and right driven parts, wherein the first energy input and output device, the left driven part, the right driven part, and the second energy input and output device are in a collinear relationship in respect of rotational speed, and are in a line in this order in a collinear chart representing the collinear relationship.

With the arrangement of the power unit according to the present invention, energy is transmitted via the energy transmission device between the first energy input and output device and the left and right driven parts, and the second energy input and output device and the left and right driven parts. Further, as shown in FIG. 25, the first energy input and output device, the left driven part, the right driven part, and the second energy input and output part are in a collinear relationship, and are in a line in a collinear chart representing the collinear relationship.

Now, assuming that the distance between the first energy input and output device and the left driven part in the collinear chart is represented by X, the distance between the left driven part and the right driven part by a value of 1, and the distance between the right driven part and the second energy input and output device by Y. In this case, the relationship between the respective torques of the first and second energy input and output devices (hereinafter referred to as "the first energy input and output device torque TIO1" and "the second energy input and output device torque TIO2", respectively) can be shown e.g. as in FIG. 25, and is represented by the following equations (1) and (2):

$$TDL = (1+X) \cdot TIO1 - Y \cdot TIO2 \tag{1}$$

$$TDR = (1+Y) \cdot TIO2 - X \cdot TIO1 \tag{2}$$

Further, assuming that the left and right driven parts transmission torques TDL and TDR are equal to each other in the above-mentioned equations (1) and (2), there is derived the following equation (3):

$$TIO1 = (1+2Y) \cdot TIO2/(1+2X) \tag{3}$$

Therefore, by controlling the first and second first energy input and output device torques TIO1 and TIO2 such that this equation (3) holds, the left and right drive parts torques TDL and TDR can be controlled such that they become equal to each other. Further, in addition to such control of the first and second first energy input and output device torques TIO1 and TIO2, by controlling the rotational speeds of the first and second energy input and output devices such that they become equal to each other, it is possible to control the rotational speeds of the left and right driven parts to the same value. This makes it possible to cause the transport machine to travel straight.

Further, in the equations (1) and (2), assuming that the right drive part transmission torque TDR>the left driven part transmission torque TDR holds, there is derived the following equation (4):

$$TIO1 < (1+2Y) \cdot TIO2/(1+2X) \tag{4}$$

Therefore, by controlling the first and second first energy input and output device torques TIO1 and TIO2 such that the equation (4) holds, it is possible to make the right driven part transmission torque TDR higher than the left driven part transmission torque TDL. In addition, as shown in FIG. 26, by making the rotational speed of the second energy input and output device higher than that of the first energy input and output device, it is possible to make the rotational speed of the right driven part higher than the left driven part. As described above, both the transmission torque TDR and the rotational speed of the right driven part can be made higher than those of the left drive part, a left turn of the transport machine can be assisted.

Further, when assisting a right turn of the transport machine, inversely to the above, by controlling the first and second first energy input and output device torques TIO1 and TIO2 such that TIO1>(1+2Y)·TIO2/(1+2X) holds, it is possible to make the left driven part transmission torque TDL higher than the right driven part transmission torque TDR. In addition, as shown in FIG. 27, by making the rotational speed of the first energy input and output device higher than that of the second energy input and output device, it is possible to make the rotational speed of the left driven part higher than the right driven part. As described above, both the transmission torque TDL and the rotational speed of the left driven part can be made higher than those of the right drive part, a right turn of the transport machine can be assisted.

As described above, according to the present invention, differently from the above-described prior art, it is possible to assist the transport machine in traveling in a line or performing a left or right turn, without using the brakes. Therefore, the omission of these brakes makes it possible to reduce the size and manufacturing costs of the power unit.

Further, from the equations (1) and (2), there are derived the following equations (5) and (6):

$$TDL-TDR=(1+2X)\cdot TIO1-(1+2Y)\cdot TIO2 \quad (5)$$

$$TDR-TDL=(1+2Y)\cdot TIO2-(1+2X)\cdot TIO1 \quad (6)$$

In this equation (5), assuming that TIO2=0 holds, TDL−TDR=(1+2×) TIO1 holds, and hence the torque difference (TDL−TDR) between the left and right driven parts becomes larger than the first energy input and output device torque TIO1. Further, in the equation (6), assuming that TIO1=0 holds, TDR−TDL=(1+2Y)·TIO2 holds, and hence the torque difference (TDR−TDL) between right and left driven parts becomes larger than the second energy input and output device torque TIO2. On the other hand, if the first and second energy input devices are directly connected to the left and right driven parts, the torque difference between the left and right driven parts becomes equal to the maximum torques that can be output by the first and second energy input and output devices, respectively, at largest.

According to the present invention, as is apparent from the above description, the torque difference between the left and right driven parts can be controlled by controlling the first and second energy input and output device torques TIO1 and TIO2 to a value larger than the maximum torques that can be output by the first and second energy input and output devices, respectively, and therefore, it is possible to obtain the larger torque difference therebetween than when the first and second energy input and output devices are directly connected to the left and right driven parts, respectively. Therefore, it is possible to increase the turnability of the transport machine.

Further, in the collinear chart, the first and second energy input and output devices are positioned outward of the left and right driven parts, respectively. This makes it possible to obtain the larger toque difference between the left and right driven parts than in the other cases including a case where the left and right driven parts are positioned outward of the first and second energy input and output devices, respectively. Therefore, it is possible to increase the turnability of the transport machine.

Preferably, the power unit further comprises an energy storing and releasing device configured to be capable of storing and releasing energy, and connected to the first energy input and output device and the second energy input and output device.

With the arrangement of this preferred embodiment, an energy storing and releasing device configured to be capable of storing and releasing energy is connected to the first energy input and output device and the second energy input and output device. This makes it possible to store power (energy) of the left and right driven parts in the energy storing and releasing device via the energy transmission device and the first and second energy input and output devices, during decelerating operation of the transport machine, and output the energy stored in the energy storing and releasing device to the left and right driven parts, as required, to make use of the stored energy.

Preferably, the first and second energy input and output devices are connected to each other in a manner capable of mutually giving and receiving energy therebetween.

With the arrangement of this preferred embodiment, the first and second energy input and output devices are connected to each other and are configured to be capable of mutually giving and receiving energy therebetween. This makes it possible to supply the power (energy) of the left driven part to the second energy input and output device via the first energy input and output device, and further to the right driven part. In this case, since the energy is input from the left drive part to the first energy input and output device, the first energy input and output device torque TIO1 assumes a negative value in the aforementioned equations (1) and (2), and hence the relationship between the first and second energy input and output device torques TIO1 and TIO2, and the left and right driven part torques TDL and TDR is represented by the following equations (7) and (8):

$$TDL=-(1+X)\cdot TIO1-Y\cdot TIO2 \quad (7)$$

$$TDR=(1+Y)\cdot TIO2+X\cdot TIO1 \quad (8)$$

As is apparent from the above-described equations (7) to (8), the left and right driven part transmission torques TDL and TDR act on the left and right driven parts as negative torque and positive torque, respectively. This reduces the speed of the left driven part and increases the speed of the right driven part. Therefore, it is possible to assist the left turn of the transport machine without supplying electric power to the first and second energy input and output devices from external devices except the left and right driven parts.

Further, it possible, inversely to the above, to supply the power (energy) of the right driven part to the first energy input and output device via the second energy input and output device, and further to the left driven part. In this case, since the energy is input from the right drive part to the second energy input and output device, the second energy input and output device torque TIO2 assumes a negative value in the aforementioned equations (1) and (2), and hence, the relationship between the first and second energy input and output device torques TIO1 and TIO2, and the left and right driven part torques TDL and TDR is represented by the following equations (9) and (10):

$$TDL=(1+X)\cdot TIO1+Y\cdot TIO2 \quad (9)$$

$$TDR=-(1+Y)\cdot TIO2-X\cdot TIO1 \quad (10)$$

As is apparent from the above-described equations (9) to (10), the left and right driven part transmission torques TDL and TDR act on the left and right driven parts as positive torque and negative torque, respectively. This increases the speed of the left driven part and reduces the speed of the right driven part. Therefore, it is possible to assist the right turn of the transport machine without supplying electric power to the first and second energy input and output devices from external devices except the left and right driven parts.

More preferably, the energy is electrical energy.

With the arrangement of this preferred embodiment, electrical energy is given and received between the first energy input output device and the second energy input output device. In general, electrical energy can be controlled with higher responsibility and accuracy than pressure energy. Therefore, according to the present embodiment, it is possible to accurately control the giving and receiving of energy between the first and second energy input and output devices, whereby it is possible to the performed the above-mentioned turn assist more appropriately.

Preferably, the first and second energy input and output devices are rotating machines.

With the arrangement of this preferred embodiment, since the rotating machines of general type are used as the first and second energy input and output devices, it is possible to construct the power unit easily and inexpensively without using a special device.

Preferably, the energy transmission device comprises a first energy transmission device having a first element, a second element, and a third element, the first to third elements having respective rotational speeds satisfying a collinear relationship, and configured such that the first to third elements are in a line in order in a collinear chart representing the collinear relationship, and a second energy transmission device having a fourth element, a fifth element, and a sixth element, the fourth to sixth elements having respective rotational speeds satisfying a collinear relationship, and configured such that the fourth to sixth elements are in a line in order in a collinear chart representing the collinear relationship. The first and fifth elements are connected to the right driven part. The second and fourth elements are connected to the left driven part. The third element is connected to the first energy input and output device, and the sixth element is connected to the second energy input and output device.

With the arrangement of this preferred embodiment, the first to three elements capable of transmitting energy to each other, having respective rotational speeds satisfying a collinear relationship, and configured such that the first to third elements are in a line in order in a collinear chart representing the collinear relationship, the fourth to sixth elements configured similarly, the first and second energy input and output devices, and the left and right driven parts are connected in the following manner: The first and fifth elements are connected to the right driven part, the second and fourth elements to the left driven part, and the third and sixth elements to the first and second energy input and output devices, respectively. Since the first to third elements of which the rotational speeds are in a collinear relationship and the fourth to sixth elements of which the rotational speeds are in a collinear relationship are connected to the first and second energy input and output devices and the left and right driven parts, as described above, as shown in FIG. 28, the first energy input and output device, the left driven part, the right driven part, and the second energy input and output device are in a collinear relationship in respect of rotational speed, and are in a line in a collinear chart representing the collinear relationship. Therefore, it is possible to obtain the above-described advantageous effects.

More preferably, the first energy transmission device is a first planetary gear unit having a first sun gear, a first ring gear, and a first carrier rotatably supporting a first planetary gear in mesh with the first sun gear and the first ring gear, and one and the other of the first element and the third element are the first sun gear and the first ring gear, and the second element is the first carrier. The second energy transmission device is a second planetary gear unit having a second sun gear, a second ring gear, and a second carrier rotatably supporting a second planetary gear in mesh with the second sun gear and the second ring gear, and one and the other of the fourth element and the sixth element are the second sun gear and the second ring gear, and the fifth element is the second carrier.

With the arrangement of this preferred embodiment, since the first and second planetary gear units of the general type are used as the first and second energy transmission devices, it is possible to construct the power unit easily and more inexpensively, without using a special device. Further, the planetary gear unit has a characteristic that it has a relatively large torque transmission capacity with respect to the size. Therefore, according to the present invention, it is possible to make the first and second energy transmission devices still smaller, hence, it is possible to make the power unit still smaller. Further, since the left and right driven parts and the first and second energy input and output devices are mechanically connected to each other via the first and second planetary gear units, it is possible to more stably secure the properties of stable traveling in a line of the left and right driven parts than when the first and second energy input and output devices are directly connected to the left and right driven parts.

Further preferably, the first element is the sun gear, the third element is the first ring gear, the fourth element is the second sun gear, and the sixth element is the second ring gear.

With the arrangement of this preferred embodiment, since the first and second energy input and output devices are connected to the first and second ring gears disposed in the peripheral locations of the respective first and second planetary gear units. Therefore, it is possible to easily perform the above-mentioned connection, and in turn the assembly of the power unit.

Preferably, the first energy input and output device is a first stator for generating a first rotating magnetic field, the first stator being immovable, and the energy input and output device is a second stator for generating a second rotating magnetic field, the second stator being immovable. The energy transmission device comprises a first rotor comprising magnets and disposed in a manner opposed to the first stator, a second rotor comprising soft magnetic material members and disposed between the first stator and the first rotor, a third rotor comprising magnets and disposed in a manner opposed to the second stator, and a fourth rotor comprising soft magnetic material members and disposed between the second stator and the third rotor. The first stator, the first rotor, and the second rotor are configured to input and output energy via magnetic circuits formed between the first stator, the first rotor, and the second rotor according to generation of the first rotating magnetic field, and in accordance with input and output of the energy, the first rotating magnetic field, the first rotor and the second rotor rotate while maintaining a collinear relationship in respective rotational speed therebetween. The second stator, the third rotor, and the fourth rotor are configured to input and output energy via magnetic circuits formed between the second stator, the third rotor, and the fourth rotor according to generation of the second rotating magnetic field, and in accordance with input and output of the energy, the second rotating magnetic field, the third rotor and the fourth rotor rotate while maintaining a collinear relationship in respective rotational speed therebetween. The first and second rotors are connected to the right driven part, and the second and third rotors are connected to the left driven part.

With the arrangement of this preferred embodiment, the energy is input and output between the first stator and the first and second rotors via a magnetic circuit formed by generation of a first rotating magnetic field of the first stator. Along with the energy input and output, the first rotating magnetic field and the first and second rotors rotate while maintaining a collinear relationship therebetween in respect of rotational speed. The linear velocity relationship between the three of the first rotating magnetic field and the first and second rotors corresponds to the velocity relationship between one and the other of the sun gear and ring gear of the planetary gear unit, and the carrier (hereinafter, these are referred to as "the three elements") supporting the planetary gears. Therefore, the relationship in the input and output energy between the first stator and the first and second rotors is the same as that between the three elements of the planetary gear unit.

Further, similarly, the energy is input and output between the second stator and the third and fourth rotors via a magnetic circuit formed by generation of a second rotating magnetic field of the second stator. Along with the energy input and output, the second rotating magnetic field and the third and fourth rotors rotate while maintaining a collinear relationship therebetween in respect of rotational speed. The linear velocity relationship between the three of the second rotating magnetic field and the third and fourth rotors corresponds to the velocity relationship between the three elements supporting the planetary gears. Therefore, the relationship in the input and output energy between the second stator and the third and fourth rotors is the same as that between the three elements of the planetary gear unit.

Further, the first and fourth rotors are connected to the right driven part, and the second and third rotors are connected to the left driven part. Therefore, the relationship between the respective rotational speeds of the first and second rotating magnetic fields of the first and second stators, the first to fourth rotors, and the left and right driven parts can be expressed e.g. as shown in FIG. 29. As illustrated therein, the first rotating magnetic field, the left driven part, the right driven part, and the second rotating magnetic field are in a collinear relationship in respect of rotational speed, and are in a line in a collinear chart representing the collinear relationship.

In this case, a torque equivalent to the electric power supplied to the first stator and the first rotating magnetic field is referred to as a first stator torque TS1, and a torque equivalent to the electric power supplied to the second stator and the second rotating magnetic field is referred to as a second stator torque TS2. As described above, both of the relationship in the input and output energy between the first stator and the first and second rotors, and the relationship in the input and output energy between the second stator and the third and fourth rotors are the same as the relationship in the input and output energy between the three elements of the planetary gear unit. From this, the relationship between the first and second stator torques TS1 and TS2, and the left and right driven part transmission torques TDL and TDR can be illustrated as in FIG. 29, and is represented by the following equations:

$$TDL = (1+X) \cdot TS1 - Y \cdot TS2 \qquad (11)$$

$$TDR = (1+Y) \cdot TS2 - X \cdot TS1 \qquad (12)$$

When comparison is made between these equations (11) and (12) and the FIG. 29 collinear chart, and the aforementioned equations (1) and (2) and the FIG. 25 collinear chart, it is apparent that in the present embodiment as well, by controlling the electric power supplied to the first and second stators and the respective rotational speeds of the first and second rotating magnetic fields, it is possible to obtain the aforementioned advantageous effects, including that the straight traveling and left and right turns of the transport machine can be assisted. Further, compared with the case where a total of eight elements, i.e. the first and second energy input and output devices, and the first to sixth elements of the energy transmission device are required, this embodiment only requires a total of six elements, i.e. the first and second stators, and the first to fourth rotors, it is possible to attain the reduction of the number of component parts of the power unit, which in turn enables the reduction of the size of the power unit.

Further, in the case where energy input and output between the first and second energy input and output devices and the left and right drive parts are performed via the planetary gear units, power transmission losses occur due to meshing of gears of the planetary gear units. According to the present embodiment, as mentioned above, the energy input and output between the first stator and the first and second rotors, and the energy input and output between the second stator and the second and third rotors are performed in a non-contacting manner via magnetic circuits, i.e. by a magnetic path. Therefore, no such transmission losses as in the planetary gear trains occur. Therefore, it is possible to improve the driving efficiency of the left and right drive parts by the first and second stators, and the electric power-generating efficiency of the first and second stators using the powers of the left and right drive parts.

The above and other objects, features, and advantages of the present invention will become more apparent from the following detailed description taken in conjunction with the accompanying drawings.

BRIEF DESCRIPTION OF THE DRAWINGS

FIG. 4A is a view showing a collinear chart illustrating an example of the relationship between the respective rotational speeds of three elements of a first planetary gear unit, together with a collinear chart illustrating an example of the relationship between the respective rotational speeds of three elements of a second planetary gear unit;

FIG. 4B is a view showing a collinear chart illustrating an example of the relationship between the respective rotational speeds of four rotary elements formed by first and second planetary gear units;

FIGS. 14A to 14C are diagrams illustrating a continuation of the operation in FIGS. 13A to 13D;

FIG. 16 is a schematic diagram illustrating torque transmitted to an A2 rotor when the first and second rotating magnetic fields are generated while holding the A1 rotor unrotatable;

DETAILED DESCRIPTION OF PREFERRED EMBODIMENTS

Figure 1:
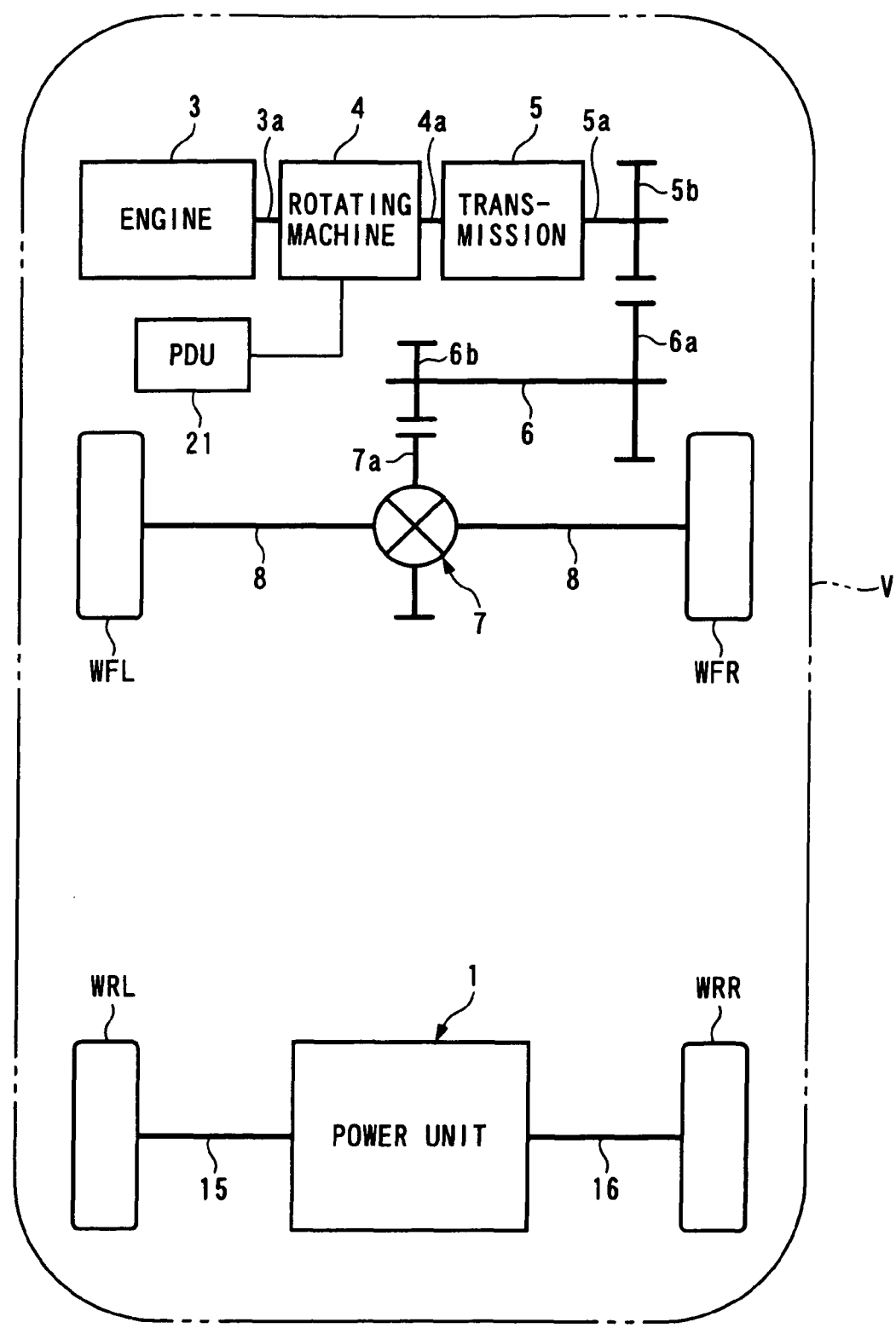
FIG. 1 is a schematic view of a vehicle to which is applied a power unit according to a first embodiment of the present invention.

The invention will now be described in detail with reference to the drawings showing preferred embodiments thereof. It should be noted that in the figures, hatching in portions illustrating cross-sections are omitted for convenience, as deemed appropriate. FIG. 1 schematically shows a vehicle V (transport machine) to which a power unit according to a first embodiment of the present invention is applied. The vehicle V is equipped with an internal combustion engine 3 and a rotating machine 4 for driving left and right forward wheels WFL and WFR, a transmission 5 and a differential gear mechanism 7 for transmitting the powers of the engine 3 and the rotating machine 4 to the front wheels WFL and WFR, and the power unit 1 for driving the left and right wheels WRL and WRR (left and right driven parts).

The internal combustion engine (hereinafter simply referred to as "the engine") 3 is an gasoline engine, for example. The rotating machine 4 is e.g. a three-phase brushless DC motor, and is comprised of a stator formed e.g. by a plurality of iron cores, coils, not shown, and a rotor which is formed e.g. by a plurality of magnets, not shown. The stator of the rotating machine 4 is fixed to an immovable casing, not shown, and is electrically connected to a battery 24 (energy storing and releasing device) and the ECU 2, referred to hereinafter, via a power drive unit 21 (hereinafter simply referred to as "the PUD") (see FIG. 3). The PDU 21 is formed by an electric circuit, such as an inverter. The rotor of the rotating machine 4 is disposed in opposed relation to the stator, and is rotatable.

In the rotating machine 4, as electric power is supplied from the battery 24 via the PDU 21, a rotating magnetic field is generated in the stator to thereby rotate the rotor together with a drive shaft 4a connected thereto. Further, when no electric power is supplied to the stator, if the rotor is rotated with respect to the stator, a rotating magnetic field is generated in the stator to generate electric power. The ECU 2 controls the PDU 21 to thereby control the electric power supplied to the rotating machine 4, and the electric power generated in the rotating machine 4.

Further, the drive shaft 4a of the rotating machine 4 is directly connected to a crankshaft 3a of the engine 3, and is mechanically connected to an input shaft (not shown) of the transmission 5. The transmission 5 is of a general step type equipped with a torque converter, and has an output shaft 5a integrally formed with a gear 5b. The gear 5b is in mesh with a first gear 6a integrally formed on an idler shaft 6. The idler shaft is rotatably supported by a bearing (not shown), and a second gear 6b integrally formed on the idler shaft 6 is in mesh with a gear 7a of the differential gear mechanism 7. Further, the differential gear mechanism 7 is mechanically connected to the left and right front wheels WFL and WFR via left and right front drive shafts 8 and 8. With the above-described arrangement, the power of the engine 3 is transmitted to the front wheels WFL and WFR while having the speed thereof changed by the transmission 5.

Figure 2:
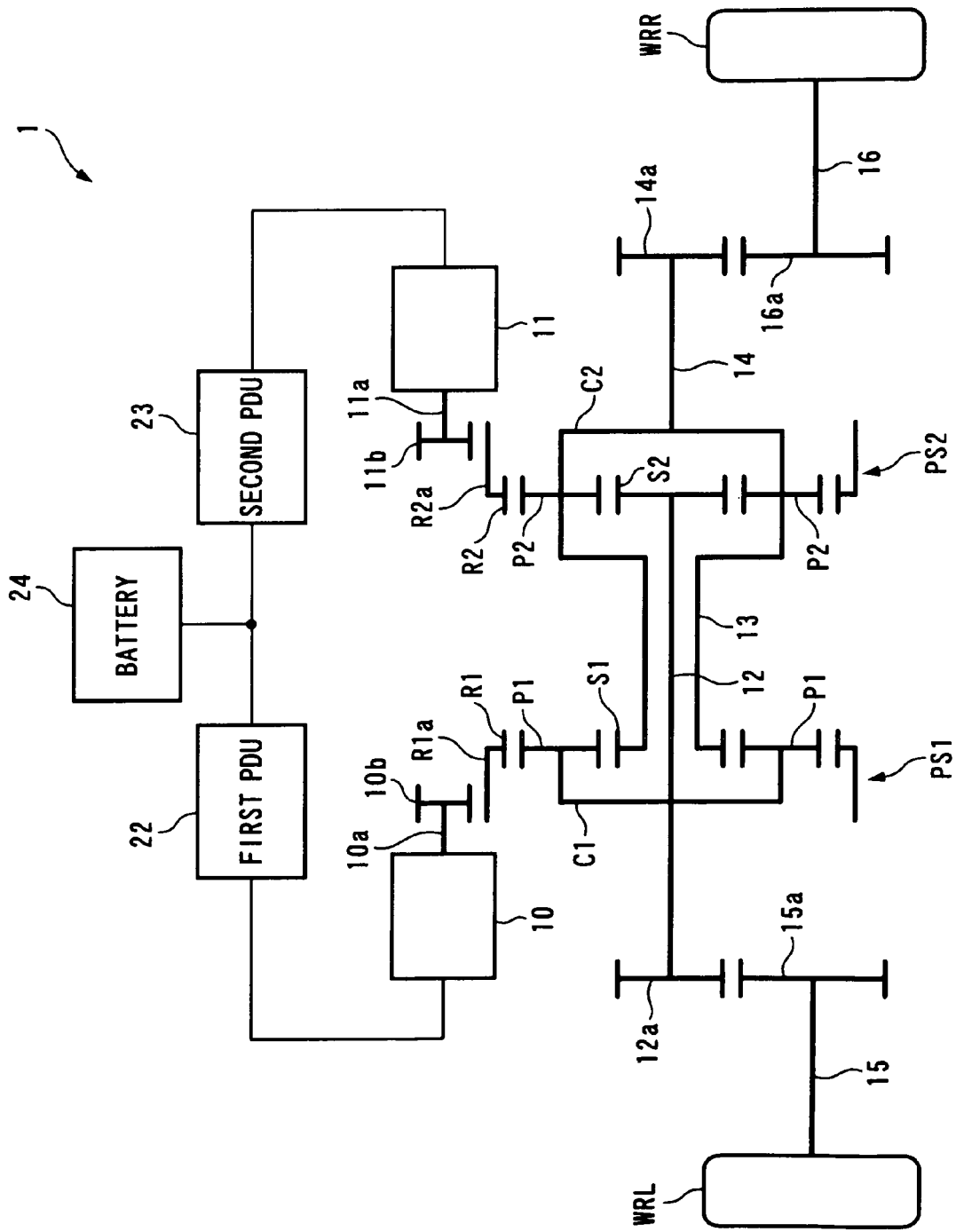
FIG. 2 is a schematic view of the FIG. 1 power unit.

As shown in FIG. 2, the above-mentioned power unit 1 is comprised of a first rotating machine 10 (first energy input and output device) and a second rotating machine 11 (second energy input and output device) as power sources, and a first planetary gear unit PS1 (energy transmission device, first energy transmission device) and a second planetary gear unit PS2 (energy transmission device, second energy transmission device) for transmitting power to the left and right rear wheels WRL and WRR.

The first and second rotating machine 10 and 11 are both three-phase brushless DC motors similarly to the above-mentioned rotating machine 4, and each includes a stator and a rotor (neither of which is shown). The output shafts 10a and 11a to which the rotors of both the motors 10 and 11 are connected respectively are integrally formed with gears 10b and 11b, respectively. Further, the first rotating machine 10 is electrically connected to the battery 24 and the ECU 2 via the first power drive unit (hereinafter referred to as "the first PDU") 22, and the second rotating machine 11 is electrically connected to the battery 24 and the ECU 2 via a second power drive unit (hereinafter referred to as "the second PDU") 23 (see FIG. 3). These first and second PDUs 22 and 23 are formed by respective electric circuits, such as inverters, similarly to the PDU 21. Further, the PDU 21 and the first and second PDUs 22 and 23 are electrically connected to each other.

The ECU 2 controls the first PDU 22 to thereby control the power supplied from the battery 24 to the first rotating machine 10, the power generated by the first rotating machine 10 to charge the battery 24, the rotational speed of the rotor of the first rotating machine 10, i.e. the output shaft 10a (hereinafter referred to as "the first rotating machine rotational speed") NM1, and torque of the first rotating machine 10 (hereinafter referred to as "the first rotating machine torque") TM1. Further, the ECU 2 controls the second PDU 23 to thereby control the power supplied from the battery 24 to the second rotating machine 11, the power generated by the second rotating machine 11 to charge the battery 24, the rotational speed of the rotor of the second rotating machine 11, i.e. the output shaft 11a (hereinafter referred to as "the second rotating machine rotational speed") NM2, and torque of the second rotating machine 11 (hereinafter referred to as "the first rotating machine torque") TM2.

The first planetary gear unit PS1 is of a general type, and is comprised of a first sun gear S1, a first ring gear R1 rotatably provided on an outer periphery of the first sun gear S1, a plurality of (e.g. three) first planetary gears P1 (only two of which are shown) in mesh with the gears S1 and R1, and a first carrier C1 that rotatably supports the first planetary gears P1. Further, the second planetary gear unit PS2 is constructed similarly to the first planetary gear unit PS1, and is comprised of a second sun gear S2, a second ring gear R2, a plurality of second planetary gears P2, and a second carrier C2 that rotatably supports the second planetary gears P2. Hereinafter, the first sun gear S1, the first ring gear R1, and the first carrier C1 are referred to as "the three elements of the first planetary gear unit PS1"), and the second sun gear S2, the second ring gear R2, and the second carrier C2 are referred to as "the second planetary gear unit PS2".

The first carrier C1 and the second sun gear S2 are integrally formed with a first connection shaft 12, and is mechanically connected to each other via the first connection shaft 12. Further, the first connection shaft 12 is rotatably supported by bearings, not shown, and is integrally formed with a gear 12a. The gear 12a is in mesh with a gear 15a formed integrally with a left rear drive shaft 15, and the rear left drive shaft 15 is integrally formed with the left rear wheel WRL, and is rotatably supported by bearings, not shown. As described above, the first carrier C1 and the second sun gear S2 are mechanically connected to the left rear wheel WRL via the first connection shaft 12 and the left rear drive shaft 15.

It should be noted that although in the present embodiment, the numbers of gear teeth of the first and second sun gears S1 and S2 are set to be equal to each other, and the numbers of gear teeth of the first and second ring gears R1 and R2 are set to be equal to each other, they are not necessarily required to be equal to each other.

Further, the above-described first sun gear S1 and the second carrier C2 are integrally formed with a second connection shaft 13, and are mechanically connected to each other via the second connection shaft 13. The second connection shaft 13 is formed to be hollow, and is rotatably supported by bearings, not shown. The above-described first connection shaft 12 is rotatably fitted in the second connection shaft 13. Further, the second carrier C2 is integrally formed with a third connection shaft 14, and the third connection shaft 14 is integrally formed with a gear 14a. The gear 14a is in mesh with a gear 16a formed integrally with a right rear drive shaft 16. The right rear shaft 16 is integrally formed with the right rear drive shaft 16 and is rotatably supported by bearings, not shown. As described above, the first sun gear S1 and the second carrier C2 are mechanically connected to the right rear wheel WRR via the second connection shaft 13, the third connection shaft 14, and the right rear drive shaft 16.

Further, a gear R1a is formed on the outer peripheral surface of the first ring gear R1, and the gear R1a is in mesh with the above-mentioned gear 10b integrally formed with the output shaft 10a of the first rotating machine 10. Further, a gear R2a is formed on the outer peripheral surface of the second ring gear R2, and the gear R2a is in mesh with the gear 11b integrally formed with the output shaft 11a of the second rotating machine 11.

Figure 3:
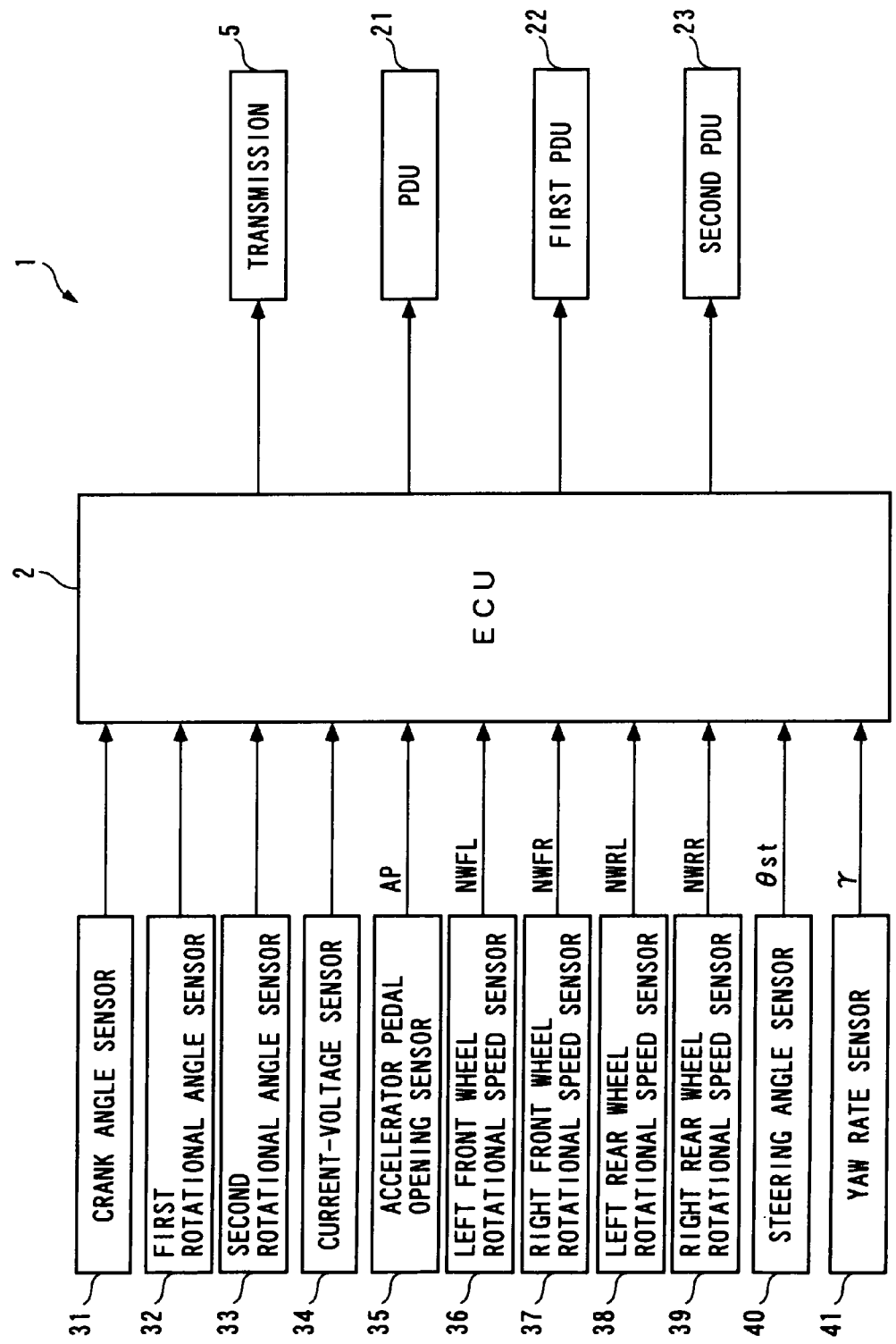
FIG. 3 is a schematic block diagram of part of the FIG. 1 power unit.

Referring to FIG. 3, a crank angle sensor 31 detects the crank angle position of the crankshaft 3a, and delivers a signal indicative of the detected crank angle position to the ECU 2. The ECU 2 calculates the rotational speed NE of the engine 3 based on the crank angle position. Further, a first rotational angle sensor 32 detects the rotational angle position of the rotor of the first rotating machine 10, and delivers a signal indicative of the detected rotational angle position to the ECU 2. The ECU 2 calculates the first rotating machine rotational speed NM1 based on the detected rotational angle position of the rotor of the first rotating machine 10. Furthermore, a second rotational angle sensor 33 detects the rotational angle position of the rotor of the second rotating machine 11, and delivers a signal indicative of the detected rotational angle position to the ECU 2. The ECU 2 calculates the second rotating machine rotational speed NM2 based on the detected rotational angle position of the rotor of the rotating machine 11.

Further, a current-voltage sensor 34 detects the values of electric current and voltage input to and output from the battery 24, and delivers signals indicative of the detected values of the electric current and voltage. The ECU 2 calculates the remaining capacity SOC of the battery 24 based on the signals from the current-voltage sensor 34. Further, an accelerator pedal opening sensor 35 detects an accelerator pedal opening AP, which is a stepped-on amount of an accelerator pedal, not shown, of the vehicle V, and delivers a signal indicative of the detected accelerator pedal opening AP to the ECU 2.

Further, a left front wheel rotational speed sensor 36 detects a rotational speed (hereinafter referred to as "the left front wheel rotational speed") NWFL of the left front wheel WFL and delivers a detection signal indicative of the detected left front wheel rotational speed NWFL to the ECU 2, and a right front wheel rotational speed sensor 37 detects a rotational speed (hereinafter referred to as "the right front wheel rotational speed") NWFR of the right front wheel WFR and delivers a detection signal indicative of the detected right front wheel rotational speed NWFR to the ECU 2. Further, a left rear wheel rotational speed sensor 38 detects a rotational speed (hereinafter referred to as "the left right wheel rotational speed") NWRL of the left rear wheel WFR and delivers a detection signal indicative of the detected left front wheel rotational speed NWRL to the ECU 2, and a right rear wheel rotational speed sensor 39 detects a rotational speed (hereinafter referred to as "the right rear wheel rotational speed") NWRR of the right rear wheel WRR and delivers a detection signal indicative of the detected right rear wheel rotational speed NWRR to the ECU 2. The ECU 2 calculates an average value of the left and right front and rear wheel rotational speeds NWFL, NWFR, NWRL, and NWRR, as a vehicle seed VP. Further, a steering angle sensor 40 detects a steering angle θst of a handle (not shown) of the vehicle V, and delivers a detection signal indicative of the detected steering angle θst to the ECU 2, and a yaw rate sensor 41 detects a yaw rate γ of the vehicle V and delivers a detection signal indicative of the detected yaw rate γ to the ECU 2.

The ECU 2 is implemented by a microcomputer comprised of an I/O interface, a CPU, a RAM, and a ROM, and controls the operations of the engine 3, the rotating machine 4, the transmission 5, and the first and second rotating machines 10 and 11 based on the signals from the aforementioned sensors 31 to 41.

FIG. 4A shows a collinear chart illustrating an example of the relationship between the respective rotational speeds of the three elements of the first planetary gear unit PS1, together with a collinear chart illustrating an example of the relationship between the respective rotational speeds of three elements of the second planetary gear unit PS2. In FIG. 4A, α represents a ratio between the number of the gear teeth of the first sun gear S1 and that of the gear teeth of the first ring gear R1, and β represents a ratio of the number of the gear teeth of the second sun gear S2 and that of the gear teeth of the second ring gear R2. As shown in FIG. 4A, in each collinear chart, the three elements of the first and second planetary gear units PS1 and PS2 are shown in a manner arranged side by side in the direction of the horizontal axis, and the rotational speeds thereof are indicated by the vertical axis, while the distances between the three elements in the direction of the horizontal axis are defined, as to the three elements of the first planetary gear unit PS1, based on the number of gear teeth of the first sun gear S1 and that of gear teeth of the first ring gear R1, and as to the three elements of the second planetary gear unit PS2, based on the number of gear teeth of the second sun gear S2 and that of gear teeth of the second ring gear R2.

As described above, since the first carrier C1 and the second sun gear S2 are connected to each other, the rotational speed of the first carrier C1 and that of the second sun gear S2 are equal to each other, and since the first sun gear S1 and the second carrier C2 are connected to each other, the rotational speed of the first sun gear S1 and that of the second carrier C2 are equal to each other. Therefore, the two collinear charts concerning the first and second planetary gear units PS1 and PS2 shown in FIG. 4A can be represented by one collinear chart as shown in FIG. 4B. As shown in FIG. 4B, four rotary elements of which rotational speeds are in a collinear relationship with each other are formed by connecting the elements of the first and second planetary gear units PS1 and PS2, as described above.

As described above, since the first ring gear R1 is connected to the first rotating machine 10, if a change in speed by the gear 10b and the like is ignored, the first rotating machine rotational speed NM1 and the rotational speed of the first ring gear R1 are equal to each other. Further, since the first carrier C1 and the second sun gear S2 are connected to the left rear wheel WRL, if a change in speed by the gear 12a and the like is ignored, the rotational speed of the first carrier C1, that of the second sun gear S2 and that of the left rear wheel WRL are equal to each other. Further, since the first sun gear S1 and the second carrier C2 are connected to the right rear wheel WRR, if a change in speed by the gear 14a and the like is ignored, the rotational speed of the first sun gear S1, that of the second carrier C2, and that of the right rear wheel WRR are equal to each other. Further, since the second ring gear R2 is connected to the second rotating machine 11, if a change in speed by the gear 11b and the like is ignored, the second rotating machine rotational speed NM2 and that of the ring gear R2 are equal to each other.

Figure 5:
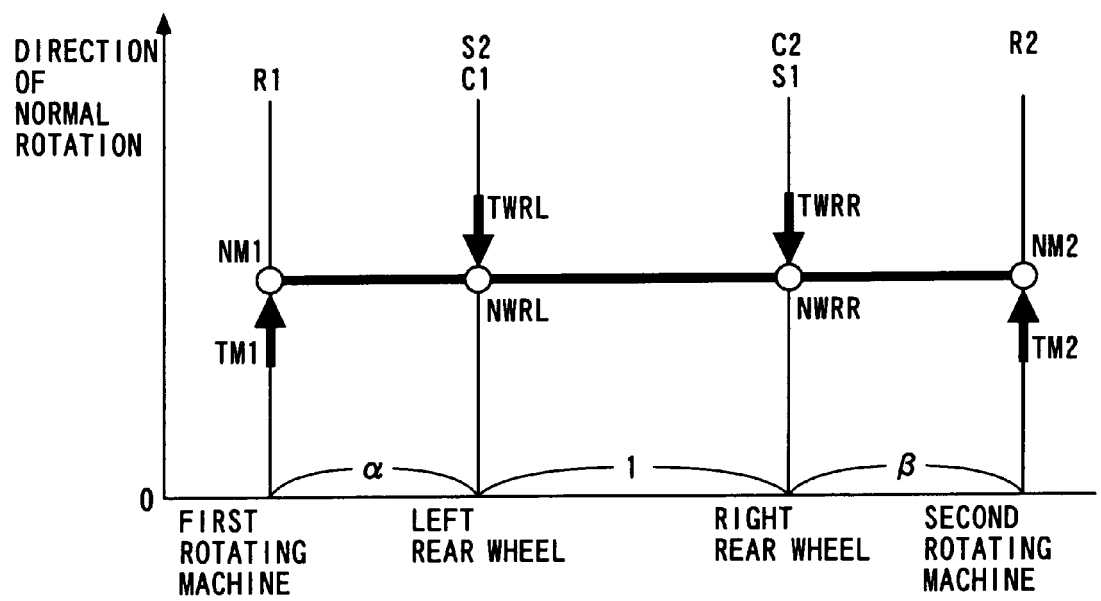
FIG. 5 is a view showing a collinear chart illustrating an example of the relationship between the respective rotational speeds of the four rotary elements formed by the first and second planetary gear units, the rotational speed of the left and right rear wheels, and the rotational speeds of first and second rotating machines, during the straight traveling of the vehicle.

As described above, the relationship between the rotational speed of the three elements of the first and second planetary gear units PS1 and PS2, the first rotating machine rotational speed NM1, the respective rotational speeds of the left and right rear wheels NWRL and NWRR, and the second rotating machine rotational speed NM2 is represented by one collinear chart e.g. as shown in FIG. 5. As shown in FIG. 5, the respective rotational speeds of the first rotating machine 10, the left and right rear wheels WRL and WRR, and the second rotating machine 11 are in a collinear relationship, and in the above collinear chart, they are in a line along the horizontal axis in the mentioned order. Hereafter, assuming that the direction of normal rotation of the output shafts of the first and second rotating machines 10 and 11 is the same as the direction of normal rotation of the left and right rear wheels WRL and WRR, as to all the rotary elements of the power unit 1, rotation in the same direction as the direction of normal rotation of the left and right rear wheels WRL and WRR is referred to as "normal rotation", and rotation in a direction opposite thereto is referred to as "reverse rotation".

Further, in this case, the relationship between the first rotating machine torque TM1 and the second rotating machine torque TM2, and respective torques (hereinafter referred to as "left rear wheel transmission torque TWRL" and "right rear wheel transmission torque TWRR") transmitted to the left and rear wheels WRL and WRR is e.g. as shown in FIG. 5, and is represented by the following equation (13) and (14):

$$TWRL=(1+\alpha)\cdot TM1-\beta\cdot TM2 \quad (13)$$

$$TWRR=(1+\beta)\cdot TM2-\alpha\cdot TM1 \quad (14)$$

In the present embodiment, the first sun gear S1 corresponds to the first element, the first carrier C1 to the second element, the first ring gear R1 to the third element, the second sun gear S2 to the fourth element, the second carrier C2 to the fifth element, and the second ring gear R2 to the sixth element.

The power unit 1 constructed as described above operate in one of the following operation modes: a vehicle straight traveling mode, a first left turn-assisting mode, a first right turn-assisting mode, a second left turn-assisting mode, a second right turn-assisting mode, and a charge mode. Hereafter, these operation modes will be described.

Vehicle Straight Traveling Mode

In the vehicle straight traveling mode, the electric power is supplied to the first and second rotating machines 10 and 11 to cause the normal rotations thereof, and the first and second rotating machine torques TM1 and TM2 are controlled such that the left rear wheel transmission torque TWRL and the right rear transmission torque TWRR become equal to each other. Specifically, assuming that the left and right rear wheel transmission torques TWRL and TWRR are equal to each other in the above-mentioned equations (13) and (14), there is derived the following equation (15):

$$TM1=(1+2\beta)\cdot TM2/(1+2\alpha) \quad (15)$$

Therefore, the first and second rotating machine torques TM1 and TM2 are controlled such that this equation (15) holds. Further, the first and second rotating machine rotational speeds NM1 and NM2 are controlled such that they become equal to each other.

By the above control, during the vehicle straight traveling mode, the left and right rear wheel transmission torques TWRL and TWRR are controlled to the same magnitude, and the left and right rear wheel rotational speeds NWRL and NWRR are controlled to the same value as shown in FIG. 5. As a consequence, the vehicle V travels forward in a straight line. Further, naturally, by causing the reverse rotations of the first and second rotating machines 10 and 11 and performing the above-mentioned control of the torques and rotational speeds, the vehicle V moves rearward in a straight line.

First Left Turn-Assisting Mode

In the first left turn-assisting mode, the electric powers are supplied to the first and second rotating machines 10 and 11 to cause the normal rotations of them, and the first and second rotating machine torques TM1 and TM2 are controlled such that the right rear wheel transmission torque TWRR becomes larger than the left rear wheel transmission torque TWRL. Specifically, assuming that the right rear transmission torque TWRR>the left rear wheel transmission torque TWRL holds in the equations (13) and (14), there is derived the following equation (16):

$$TM1<(1+2\beta)\cdot TM2/(1+2\alpha) \quad (16)$$

Therefore, the first and second rotating machine torques TM1 and TM2 are controlled such that this equation (16) is holds. Further, the second rotating machine rotational speed NM2 is controlled to be higher than that of the first rotating machine rotational speeds NM1.

Figure 6:
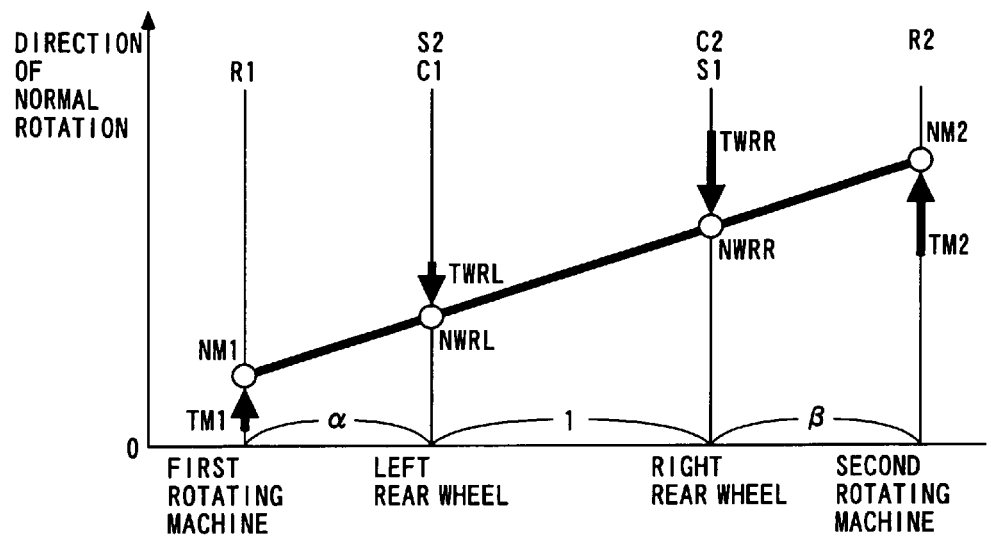
FIG. 6 is a view showing a collinear chart illustrating an example of the relationship between the rotational speeds of the four rotary elements formed by the first and second planetary gear units, the rotational speed of the left and right rear wheels, and the rotational speeds of the first and second rotating machines, during a first left turn-assisting mode.

By the above control, during the first left turn-assisting mode, the right rear wheel transmission torque TWRR becomes larger than the left rear wheel transmission torque TWRL, and the right rear wheel rotational speed NWRR becomes higher than the left rear wheel rotational speed NWRL, as shown in FIG. 6. As a consequence, the left turn of the vehicle V travelling forward is assisted. Further, naturally, by causing the reverse rotations of the first and second rotating machines 10 and 11, and performing the above-mentioned control of the torques and rotational speeds, the left turn of the vehicle traveling rearward is assisted. Further, the above-mentioned control of the torques and rotational speeds is performed according to the steering angle θst, the vehicle speed VP, and the yaw rate γ.

First Right Turn-Assisting Mode

In the first right turn-assisting mode, the powers are supplied to the first and second rotating machines 10 and 11 to cause the normal rotations of them, and the first and second rotating machine torques TM1 and TM2 are controlled in a manner opposite to the first left turn-assisting mode such that the left rear wheel transmission torque TWRL becomes larger than the right rear wheel transmission torque TWRR. Specifically, the first and second rotating machine torques TM1 and TM2 are controlled such that $TM1>(1+2\beta)\cdot TM2/(1+2\alpha)$ holds. Further, the first rotating machine rotational speed NM1 and the second rotating machine rotational speed NM2 are controlled such that the former becomes larger than the latter.

Figure 7:
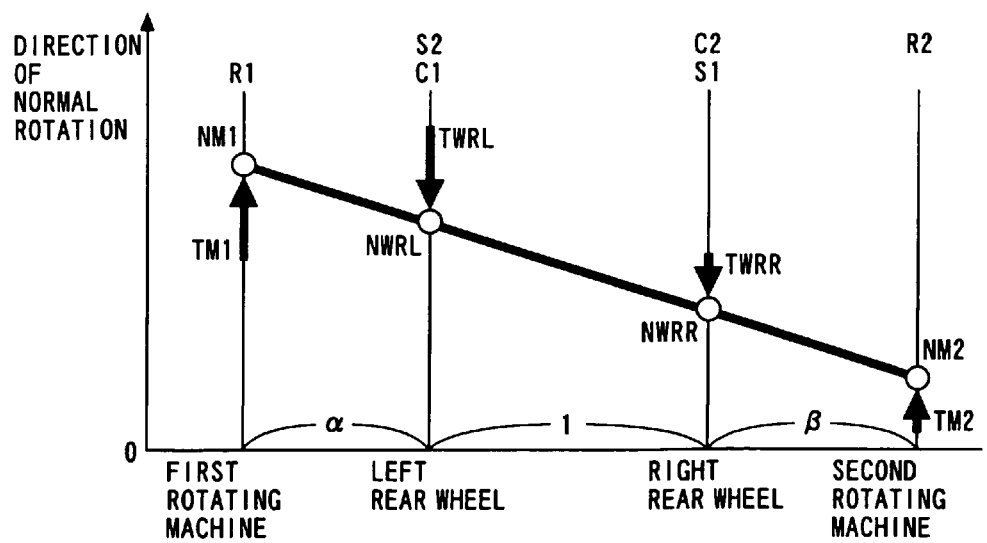
FIG. 7 is a view showing a collinear chart illustrating an example of the relationship between the rotational speeds of the four rotary elements formed by the first and second planetary gear units, the rotational speed of the left and right rear wheels, and the rotational speeds of the first and second rotating machines, during a first right turn-assisting mode.

By the above control, in the first right turn-assisting mode, the left rear wheel transmission torque TWRL becomes larger than the right rear wheel transmission torque TWRR, and as shown in FIG. 7, the left rear wheel rotational speed NWRL becomes higher than the right rear wheel rotational speed NWRR. As a consequence, the right turn of the vehicle V travelling forward is assisted. Further, naturally, by causing the reverse rotations of the first and second rotating machines 10 and 11, and controlling the above-mentioned control of the torques and rotational speeds, the right turn of the vehicle travelling rearward is assisted. Further, similarly to the first left turn-assisting mode, the above-mentioned control of the torques and rotational speeds is performed according to the steering angle θst, the vehicle speed VP, and the yaw rate γ.

Further, in the vehicle straight traveling mode and the first left and right turn-assisting modes, the electric power of the battery 24 and/or the electric power generated by the rotating machine 4 is/are supplied to the first and second rotating machines 10 and 11. In this case, the supply of the power generated by the rotating machine 4 is executed via the PDU 21 and the first and second PDUs 22 and 23.

Second Left Turn-Assisting Mode

In the second left turn-assisting mode, none of the battery 24 and the rotating machine 4 supply electric power to the first and second rotating machines 10 and 11, and using the power of the left rear wheel WRL, electric power is generated by the first rotating machine 10, and the generated electric motor is supplied to the second rotating machine 11 to cause the same to rotate in the same direction as the direction of rotations of the left and right rear wheels WRL and WRR. In this case, assuming that the torque transmitted to the first rotating machine 10 according to the generation of electric power is represented by first regenerative torque TGM1, the relationship between the first regenerative torque TGM1 and the second rotating machine torque TM2, and the left and right rear wheel torques TWRL and TWRR is represented by the following equations (17) and (18):

$$TWRL=-(1+\alpha)\cdot TGM1-\beta\cdot TM2 \quad (17)$$

$$TWRR=(1+\beta)\cdot TM2+\alpha\cdot TGM1 \quad (18)$$

As is apparent from these equations (17) and (18), the left and right rear wheel transmission torques TWRL and TWRR act on the left and right rear wheels WRL and WRR as negative torque and positive torque, respectively. This reduces the speed of the left rear wheel WRL and increases the speed of the right rear wheel WRR. As a consequence, the left turn of the vehicle V is assisted. The above-described second left turn-assisting mode is carried out on conditions that the remaining capacity SOC is small and the like during turning of the vehicle V. Further, the electric power generated by the first rotating machine 10, the second rotating machine torque TM2, and the first and second rotating machine rotational speeds NM1 and NM2 are controlled based on the steering angle θst, the vehicle speed VP, and the yaw rate γ.

Second Right Turn-Assisting Mode

In the second right turn-assisting mode, no electric power is supplied from any of the battery 24 and the rotating machine 4 to the first and second rotating machine 10 and 11, but electric power is generated by the second rotating machine 11 using the right rear wheel WRR to supply the generated electric power to the first rotating machine 10, causing the first rotating machine 10 to rotate in the same direction as the direction of rotations of the left and right rear wheels WRL and WRR. In this case, assuming that the torque transmitted to the second rotating machine 11 according to the generation of electric power is represented by a second regenerative torque TGM2, the relationship between the second regenerative torque TGM2, the first rotating machine torque TM1, and the left and right rear wheel transmission torques TWRL and TWRR is represented by the following equations (19) and (20):

$$TWRL = (1+\alpha) \cdot TM1 + \beta \cdot TGM2 \quad (19)$$

$$TWRR = -(1+\beta) \cdot TGM2 - \alpha \cdot TM1 \quad (20)$$

As is apparent from these equations (19) and (20), the left and right rear wheel transmission torques TWRL and TWRR act on the left and right rear wheels WRL and WRR as positive torque and negative torque, respectively. This increases the speed of the left rear wheel WRL and reduces the speed of the right rear wheel WRR. As a consequence, the right turn of the vehicle V is assisted. The above-described second right turn-assisting mode is executed on conditions that the remaining capacity SOC is small and the like during right turn of the vehicle V. Further, the electric power generated by the second rotating machine 11, and the first and second rotating machine rotational speeds NM1 and NM2 are controlled based on the steering angle θst, the vehicle speed VP, and the yaw rate γ.

Charge Mode

In the charge mode, using the powers of the left and right rear wheels WRL and WRR, electric power is generated by the first and second rotating machines 10 and 11 and the battery 24 is charged with the generated electric power. In this case, the electric power generated by the first rotating machine 10 and the electric power generated by the second rotating machine 11 are controlled such that the left and right rear wheel transmission torques TWRL and TWRR become equal to each other.

Specifically, this control is performed in the following manner: The relationship between the first and second regenerative torques TGM1 and TGM2 and the left and right rear wheel transmission torques TWRL and TWRR is represented by the following equations (21) and (22):

$$TWRL = \beta \cdot TGM2 - (1+\alpha) \cdot TGM1 \quad (21)$$

$$TWRR = \alpha \cdot TGM1 - (1+\beta) \cdot TGM2 \quad (22)$$

Further, assuming that the left and right rear wheel transmission torques TWRL and TWRR are equal to each other in the above equations (21) and (22), there is derived the following equation (23):

$$TGM1 = (1+2\beta) \cdot TGM2/(1+2\alpha) \quad (23)$$

Therefore, the electric power generated by the first rotating machine 10 and the electric power generated by the second rotating machine 11 are controlled such that the above equation (23) holds. Further, the first and second rotating machine rotational speeds NM1 and NM2 are controlled such that they become equal to each other.

Thus, in the charge mode, the left and right rear wheel transmission torques TWRL and TWRR are controlled to the same magnitude, and the left and right rear wheel rotational speeds NWRL and NWRR are controlled to the same value. Therefore, while maintaining excellent straight traveling properties of the vehicle V, it is possible to charge the battery 2 by converting the powers of the left and right rear wheels into electric power. It should be noted that the operation in the charge mode is executed when the remaining capacity SOC of the battery 24 is small, and at the same time the vehicle V is performing decelerating travelling (the accelerator opening AP is approximately set to 0).

As described above, according to the present embodiment, differently from the prior art, it is possible to assist the vehicle V in traveling in a line or performing a left or right turn, without using the brakes. Therefore, the omission of these brakes makes it possible to reduce the size and manufacturing costs of the power unit 1. Further, as is apparent from comparison between the aforementioned equations (1) and (2) and the equations (13) and (14), the torque difference between the left and right rear wheels WRL and WRR can be controlled to a value larger than the maximum torques that can be output by the first and second rotating machines 10 and 11, respectively, and therefore, it is possible to obtain the larger torque difference therebetween than when the first and second rotating machines 10 and 11 are directly connected to the left and right rear wheels WRL and WRR. Therefore, it is possible to increase the turnability of the vehicle V.

Further, as shown in FIG. 5, in the collinear chart, the first and second rotating machines 10 and 11 are positioned outward of the left and right rear wheels WRL and WRR, respectively. This makes it possible to obtain the larger toque difference between the left and right rear wheels WRL and WRR than in the other cases including a case where the left and right rear wheels WRL and WRR are positioned outward of the first and second rotating machines 10 and 11, respectively. Therefore, it is possible to increase the turnability of the vehicle V.

Further, in the charge mode in which the battery 24 is charged with electric power generated by the first and second rotating machines 10 and 11 using the powers of the left and right rear wheels WRL and WRR, as is apparent from the equations (21) and (22), as the electric charging is performed, the decelerating torques act on the left and right rear wheels WRL and WRR from the first and second rotating machines 10 and 11. According to the present embodiment, the operation in the charge mode is performed during decelerating traveling of the vehicle V, which makes it possible to reduce load on the brake for reducing the speed of the vehicle V.

Further, in the second left turn-assisting mode and the second right turn-assisting mode, it is possible to assist the left turn and right turn of the vehicle V without supplying electric power to the first and second rotating machines 10 and 11 from any of the battery 24 and the rotating machine 4. Further, in the second left turn-assisting mode and the second right turn-assisting mode, since electric energy is used as the energy given and received between the first and second rotating machines 10 and 11, the giving and receiving of the electric energy can be accurately controlled, which makes it possible to properly assist the left turn and the right turn of the vehicle V. Further, since the first and second rotating machines of general type are used, it is possible to construct the power unit 1 easily and inexpensively without using a special device.

Since the first and second planetary gear units PS1 and PS2 of the general type are used, it is possible to construct the power unit 1 easily and more inexpensively, without using a special device, and make the power unit 1 still smaller. Further, since the first and second rotating machines 10 and 11 are connected to the first and second ring gears R1 and R2, the connection, and in turn the assembly of the power unit 1 can be easily performed. Further, since the left and right rear wheels WRL and WRR and the first and second rotating machines 10 and 11 are mechanically connected to each other via the first and second planetary gear units PS1 and PS2, it is possible to more stably secure the properties of stable traveling in a line of the left and right rear wheels WRL and WRR than when the first and second rotating machines 10 and 11 are directly connected to the left and right rear wheels WRL and WRR.

It should be note that although in the first embodiment, the first and second rotating machines 10 and 11 are used as the first and second energy input and output devices of the present invention, any other suitable devices capable of inputting and outputting energy, such as hydraulic motors and air-pressure motors, may be used. In such a case, in stead of the battery 24 as the energy storing and releasing device of the present invention, an accumulator is used. Further, although in the present embodiment, the first and second planetary gear units PS1 and PS2 are employed as the first and second energy transmission devices, other devices may be employed which have the functions equivalent to the planetary gear units, such as a plurality of rollers for transmitting power by friction between surfaces, instead of the gears of the planetary gear units.

Further, in the first embodiment, the first carrier C1 and the second sun gear S2 are connected to each other, and the first sun gear S1 and the second carrier C2 are connected to each other, insofar as the first carrier C1 and the second sun gear S2 are connected to the left rear wheel WRL, they may not be connected to each other, and further, since the first sung gear S1 and the second carrier C2 are to the right rear wheel WRR, they may not be connected to each other.

Further, in the first embodiment, the connecting relationship between the first and second rotating machines 10 and 11, the left and right rear wheels WRL and WRR, the first and second sun gears S1 and S2, the first and second carriers C1 and C2, the first and second ring gears R1 and R2 can be arbitrarily set insofar as it satisfies the following conditions: One of the second sun gear S2 and the second ring gear R2 and the first carrier C1 is connected to the left rear wheel WRL, and one of the first sun gear S1 and the first ring gear R1 and the second carrier C2 is connected to the right rear wheel WRR, while the other of the first sun gear S1 and the first ring gear R1 is connected to the first rotating machine 10 and the other of the second sun gear S2 and the second ring gear R2 is connected to the second rotating machine 11. For example, the first carrier C1 and the second ring gear R2 may be connected to the left rear wheel WRL, the first ring gear R1 and the second carrier C2 may be connected to the right rear wheel WRR, and the first and second sun gears S1 and S2 may be connected to the first and second rotating machines 10 and 11, respectively.

Further although in the first embodiment, brushless DC motors are used as the first and second rotating machines 10 and 11, AC motors may be used, for example. Further, in the first embodiment, the rotors of the first and second rotating machines 10 and 11 may be integrally formed with the first and second ring gears R1 and R2.

Next, a description will be given of a power unit 1A according to a second embodiment of the present invention with reference to FIGS. 8 to 24. The power unit 1A is distinguished from the power unit 1 according to the first embodiment in that instead of the first planetary gear unit PS1 and the first rotating machine 10 and the second planetary gear unit PS2 and the second planetary gear unit 11, a third rotating machine 50 and a fourth rotating machine 60 are provided. In FIGS. 8 to 24, the same component units in the first embodiment are indicated by the same reference numerals. In the following, the description will be mainly given of different points from the first embodiment.

Figure 8:
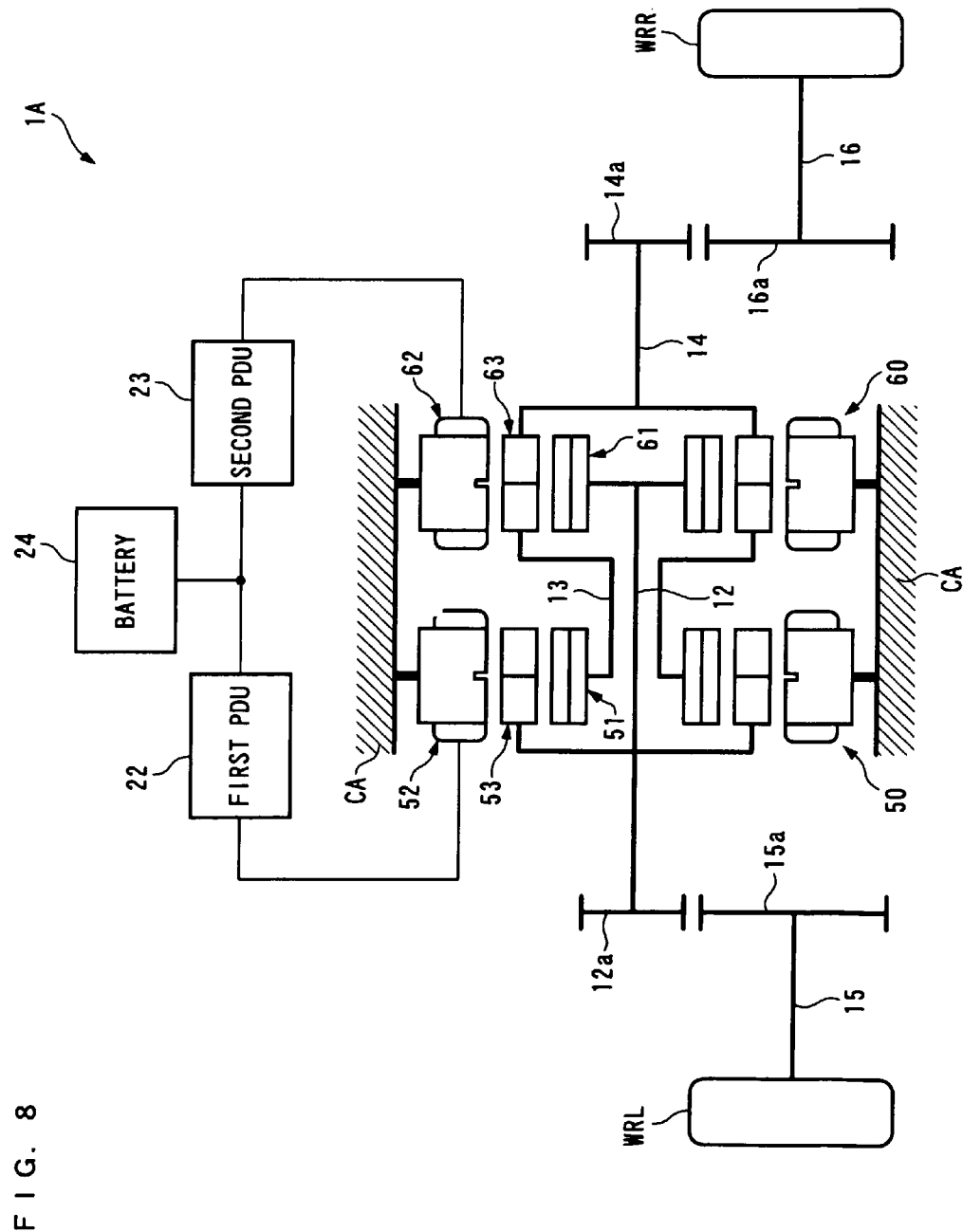
FIG. 8 is a schematic view of a power unit according to a second embodiment of the present invention.
Figure 10:
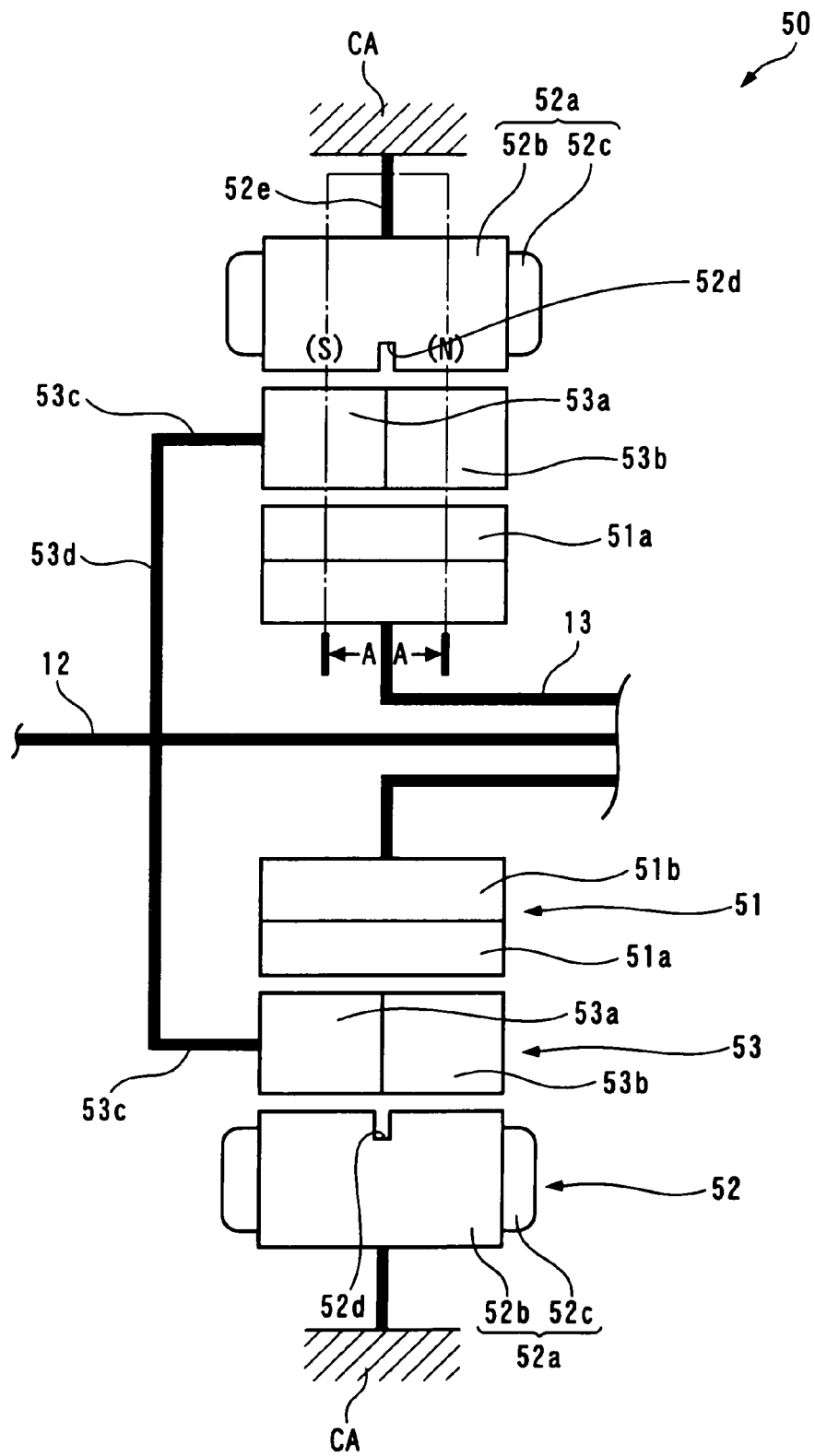
FIG. 10 is an enlarged cross-sectional view of a third rotating machine.

As shown in FIGS. 8 and 10, the third rotating machine 50 is comprised of a A1 rotor 51, a third stator 52 disposed in a manner opposed to the A1 rotor 51, and a A2 rotor 53 disposed between the two 51 and 52 at predetermined spaced intervals. The A1 rotor 51, the A2 rotor 53, and the third stator 52 are radially arranged from the inner side in the mentioned order. Hereinafter, the left side and the right side as viewed in FIG. 10 will be referred to as "left" and "right" as deemed appropriate.

The A1 rotor 51 has 2n permanent magnets 51a. The permanent magnets 51a are mounted on the outer peripheral surface of an annular fixing portion 51b in a state arranged at equal intervals in the circumferential direction. Each permanent magnet 51a has a generally sector-shaped cross-section orthogonal to the axial direction, and slightly extends in the axial direction. The above-mentioned fixing portion 51b is formed of a soft magnetic material element, such as iron, and has an inner peripheral surface thereof integrally attached to the second connection shaft 13. With the above arrangement, the permanent magnets 51a, that is, the A1 rotor 51, are rotatable in unison with the second connection shaft 13.

Figure 11:
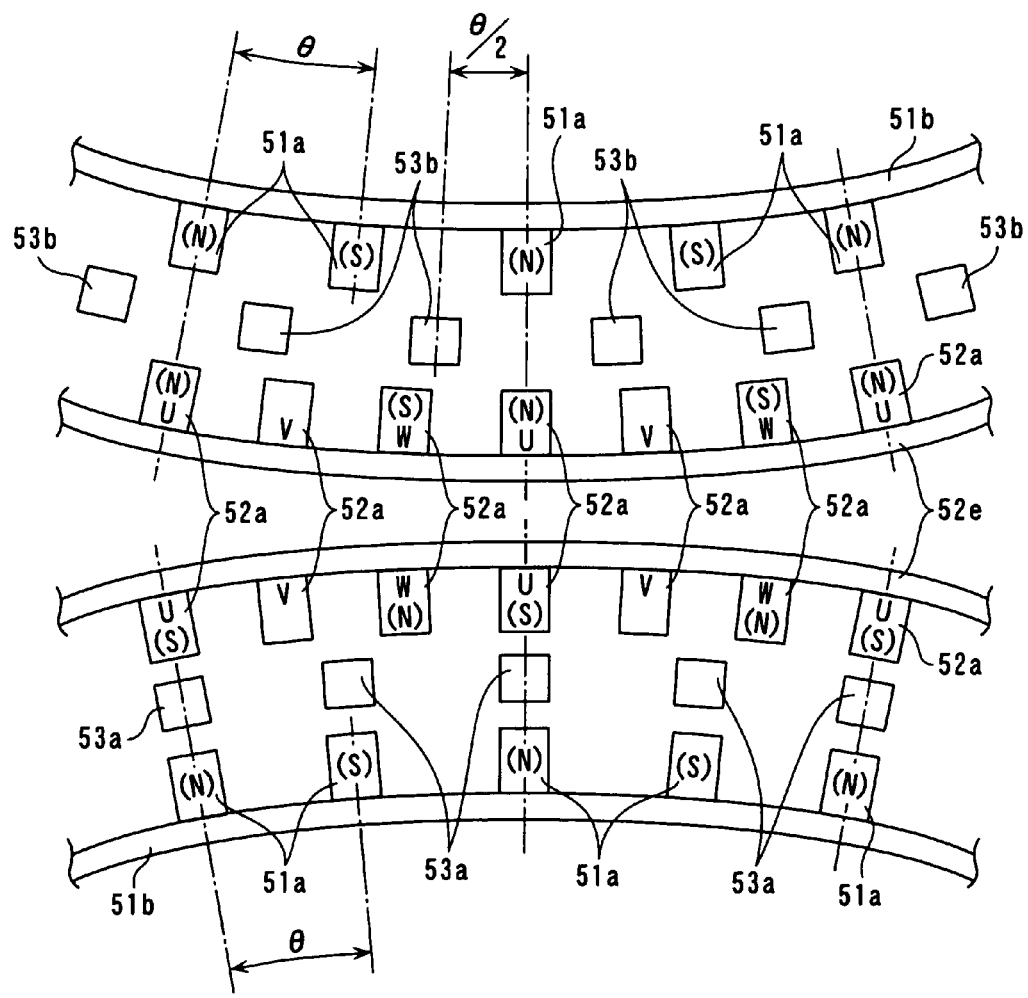
FIG. 11 is a development view of part of a cross-section of the FIG. 1 power transmission drive system taken on line A-A of FIG. 10 during generation of first and second rotating magnetic fields.

Further, as shown in FIG. 11, a central angle formed by each two permanent magnets 51a circumferentially adjacent to each other about the second connection shaft 13 is a predetermined angle θ. Further, the two permanent magnets 51a circumferentially adjacent to each other have polarities different from each other. Hereafter, respective magnetic poles at left and right ends of the permanent magnet 51a are referred to as "the first magnetic pole" and "the second magnetic pole", respectively.

The third stator 52 generates rotating magnetic fields, and has 3n armatures 52a arranged at equal intervals in the circumferential direction. Each armature 52a is comprised of an iron core 52b, a coil 52c wound around the iron core 52b, and so forth. The iron core 52b has a generally sector-shaped cross-section orthogonal to the axial direction, and has approximately the same axial length as that of the permanent magnet 51a. An axially central portion of the inner peripheral surface of the iron core 52b is formed with a circumferentially extending groove 52d. The 3n coils 52c form n sets of three-phase coils of U-phase coils, V-phase coils, and W-phase coils (see FIG. 11). Further, the armature 52a are mounted on the case CA via an annular fixing portion 52e such that the armatures 52a are immovable. Due to the numbers and the arrangements of the armatures 52a and the permanent magnets 51a, when the center of a certain armature 52a circumferentially coincides with the center of a certain permanent magnet 51a, the center of every third armature 52a from the armature 52a, and the center of every second permanent magnet 51a from the permanent magnet 51a circumferentially coincides with each other.

Furthermore, each armature 52a is electrically connected to the battery 24 and the ECU 2 via the first PDU 22. Further, the armature 52a is configured such that when it is supplied with electric power from the battery 24 or generates electric power, as described hereinafter, magnetic poles having different polarities from each other are generated on the left and right ends of the iron core 52b, respectively. Further, in accordance with generation of these magnetic poles, first and second rotating magnetic fields are generated between the left portion of the A1 rotor 51 (on the first magnetic pole side) and the left end of the iron core 52b, and between the right portion of the A1 rotor 51 (on the second magnetic pole side) and the right end of the iron core 52b in a circumferentially rotating manner, respectively. Hereinafter, the magnetic poles generated on the left and right ends of the iron core 52b are referred to as "the first armature magnetic pole" and "the second armature magnetic pole". Further, the number of the first armature magnetic poles and that of the second armature magnetic poles are the same as the number of the magnetic poles of the permanent magnets 51a, that is, 2n, respectively.

The A2 rotor 53 has a plurality of first cores 53a and a plurality of second cores 53b. The first and second cores 53a and 53b are arranged at equal intervals in the circumferential direction, respectively, and the numbers of 53a and 53b are both set to the same number as that of the permanent magnets 51a that is, 2n. Each first core 53a is formed by laminating soft magnetic material elements, such as a plurality of steel plates, such that it has a generally sector-shaped cross-section orthogonal to the axial direction, and extends by a length approximately equal to a half of the length of the permanent magnet 51a in the axial direction. Similarly to the first core 53a, each second core 53b is formed by laminating a plurality of steel plates, such that it has a generally sector-shaped cross-section orthogonal to the axial direction, and extends by a length approximately equal to a half of the length of the permanent magnet 51a in the axial direction.

Further, the first cores 53a are each axially arranged between the left portion of the A1 rotor 51 (on the first magnetic pole side) and the left portion of the third stator 52 (on the first armature magnetic pole side), and the second cores 53b are each axially arranged between the right portion of the A1 rotor 51 (on the second magnetic pole side) and the right portion of the third stator 52 (on the second armature magnetic pole side). Furthermore, the second cores 53b are circumferentially alternately arranged with respect to the first cores 53a, and the center of the second cores 53b is displaced by a half of the aforementioned predetermined angle θ from the center of the first cores 53a (see FIG. 11).

The first and second cores 53a and 53b are mounted on an outer end of a flange 53d by bar-shaped connecting portion 53c slightly extending in the axial direction, respectively. The flange 53d is integrally concentrically fitted on the first connection shaft 12. With this arrangement, the first and second cores 53a and 53b, that is, the A2 rotor 53, are rotatable in unison with the first connection shaft 12, and connected to the left rear wheel WRL via the first connection shaft 12.

In the third rotating machine 50 configured as above, as shown in FIG. 11, during generation of the first and second rotating magnetic fields, when the polarity of each first armature magnetic pole is different from the polarity of an opposed (closest) one of the first magnetic poles, the polarity of each second armature magnetic pole is the same as the polarity of an opposed (closest) one of the second magnetic poles. Further, when each first core 53a is in a position between each first magnetic pole and each first armature magnetic pole, each second core 53b is in a position between a pair of second magnetic poles circumferentially adjacent to each other and a pair of second armature magnetic poles circumferentially adjacent to each other. Furthermore, although not shown, during generation of the first and second rotating magnetic fields, when the polarity of each second armature magnetic pole is different from the polarity of an opposed (closest) one of the second magnetic poles, the polarity of each first armature magnetic pole is the same as the polarity of an opposed (closest) one of the first magnetic poles. Further, when each second core 53b is in a position between each second magnetic pole and each second armature magnetic pole, each first core 53a is in a position between a pair of first armature magnetic poles circumferentially adjacent to each other, and a pair of first magnetic poles circumferentially adjacent to each other.

Figure 12:
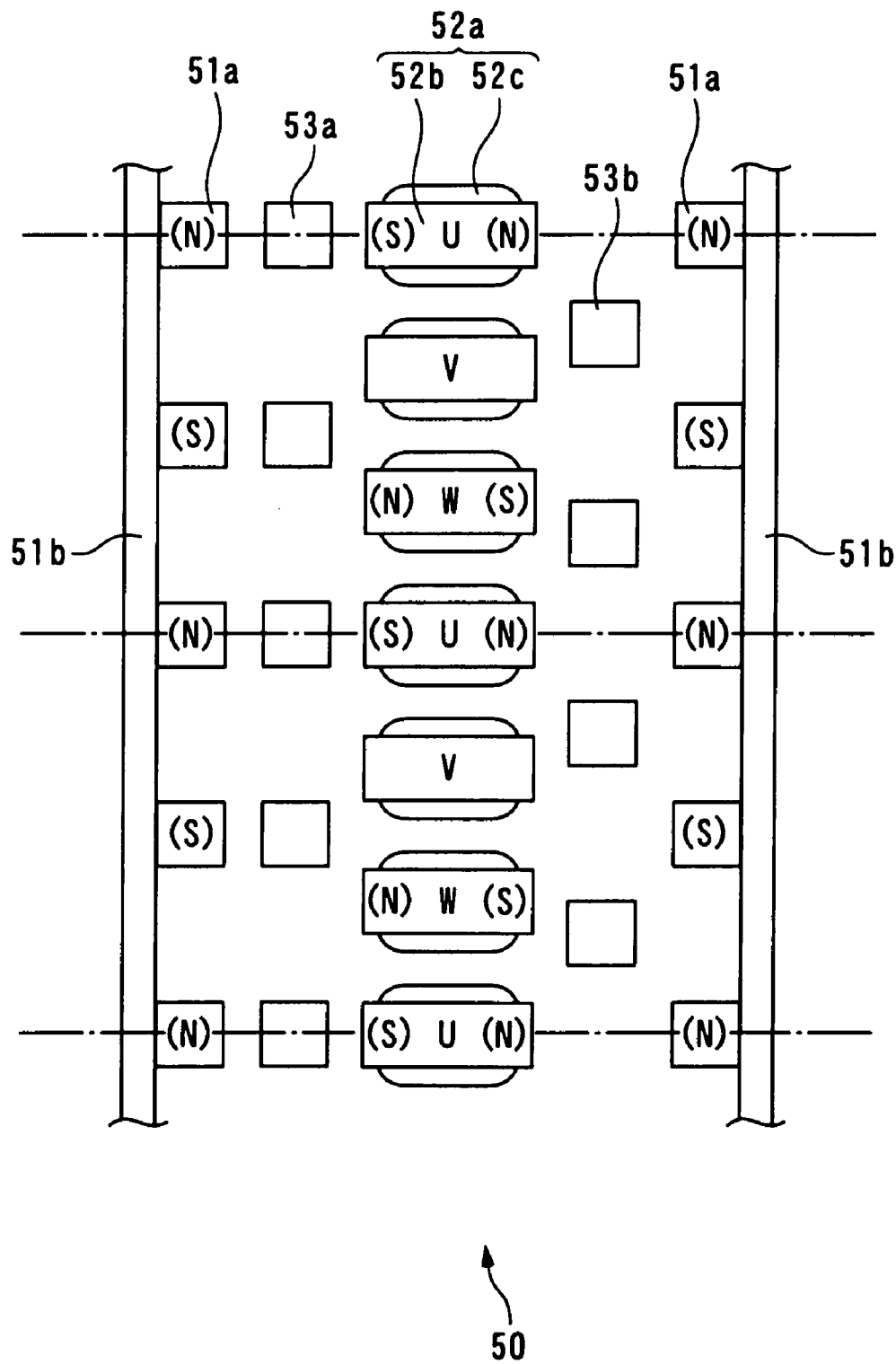
FIG. 12 is a diagram showing an arrangement functionally equivalent to the arrangement of the FIG. 11 development view.

The third rotating machine 50 can be also regarded as a planetary gear unit which inputs and outputs torque by the A1 and A2 rotors 51 and 53, and inputs and outputs electric power by the third stator 52. The following description is given of this point based on the operation of the third rotating machine 50. It should be noted that although in FIG. 11, the armatures 52a and the fixing portion 52e are shown as if they were divided into two other parts since FIG. 11 is shown as a development view, actually, they are integrally formed with each other, so that the arrangement in FIG. 11 can be shown as in FIG. 12 as equivalent thereto. Therefore, hereinafter, the operation of the third rotating machine 50 is described assuming that the permanent magnets 51a, the armatures 52a, and the first and second cores 53a and 53b are arranged as shown in FIG. 12.

Further, for convenience of description, the operation of the third rotating machine 50 is described by replacing the motion of the first and second rotating magnetic fields by an equivalent physical motion of 2n imaginary permanent magnets (hereinafter referred to as "the imaginary magnets") VM, equal in number to the permanent magnets 51a. Further, the description will be given assuming that a magnetic pole at a left-side portion of each imaginary magnet VM (on the first magnetic pole side), and a magnetic pole at a right-side portion of the imaginary magnet VM (on the second magnetic pole side) are regarded as first and second armature magnetic poles, respectively, and that rotating magnetic fields generated between the left-side portion of the imaginary magnet VM and the left portion of the A1 rotor 51 (on the first magnetic pole side), and between the right-side portion of the imaginary magnet VM and the right portion of the A1 rotor 51 (on the second magnetic pole side) are regarded as first and second rotating magnetic fields. Furthermore, hereinafter, the left-side portion and the right-side portion of the permanent magnet 51a are referred to as "the first magnet portion" and "the second magnet portion".

First, a description will be given of the operation of the third rotating machine 50 in a state where the A1 rotor 51 is made unrotatable, and the first and second rotating magnetic fields are generated by the supply of electric power to the third stator 52a.

Figure 13A:
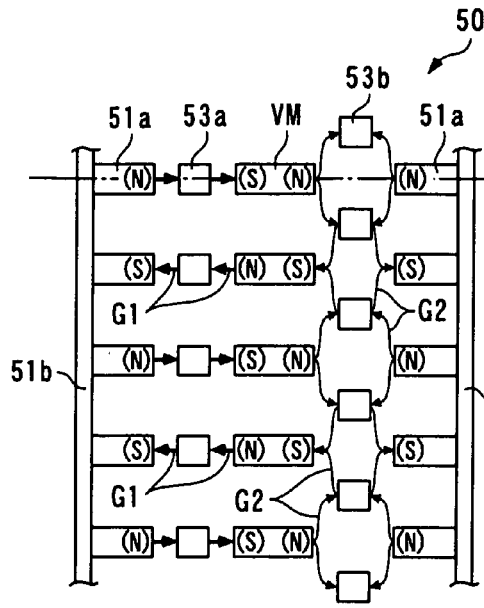
FIGS. 13A to 13D are diagrams illustrating the operation of a third rotating machine in the case where the first and second rotating magnetic fields are generated while holding an A1 rotor unrotatable.

As shown in FIG. 13A, the first and second rotating magnetic fields are generated in a manner rotated downward, as viewed in the figure, from a state in which each first core 53a is opposed to each first magnet portion, and each second core 53b is in a position between each adjacent two of the second magnet portions. At the start of the generation of the first and second rotating magnetic fields, the polarity of each first armature magnetic pole is made different from the polarity of each opposed one of the first magnetic poles, and the polarity of each second armature magnetic pole is made the same as the polarity of each opposed one of the second magnetic poles.

Since the first cores 53a are disposed as described above, they are magnetized by the first magnetic poles and the first armature magnetic poles, and magnetic lines G1 of force (hereinafter referred to as "the first magnetic lines G1") are generated between the first magnetic poles, the first cores 53a, and the first armature magnetic poles. Similarly, since the second cores 53b are disposed as described above, they are magnetized by the second armature magnetic poles and the second magnetic poles, and magnetic lines G2 of force (hereinafter referred to as "the second magnetic lines G2") are generated between the second armature magnetic poles, the second cores 53b, and the second magnetic poles.

Figure 15A:
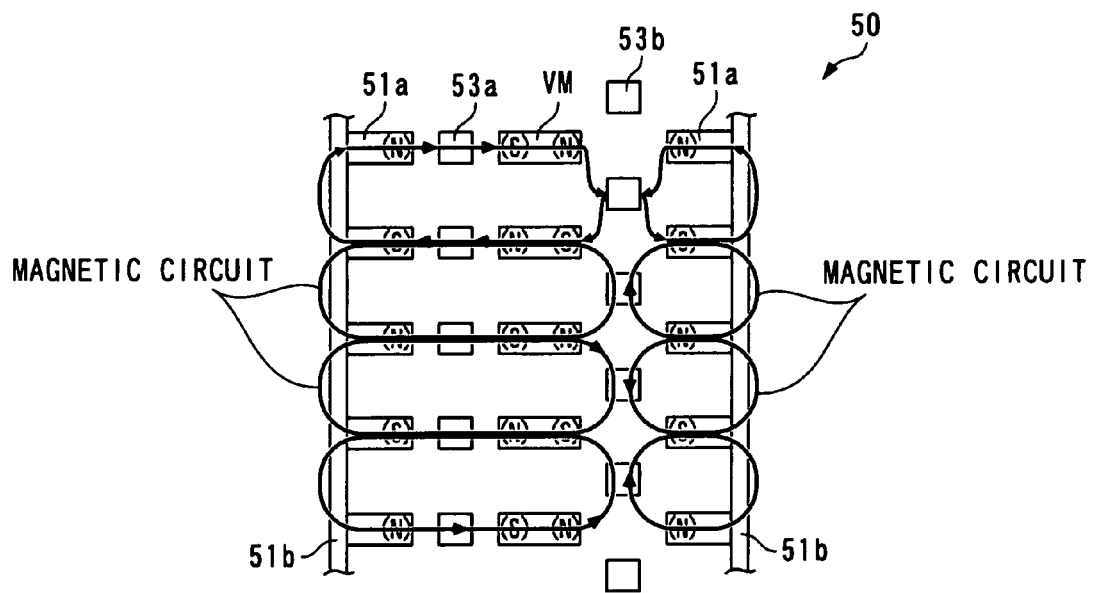
FIGS. 15A and 15B are diagrams each showing magnetic circuits formed when the third rotating machine is in operation.

In the state shown in FIG. 13A, the first magnetic lines G1 are generated such that they each connect the first magnetic pole, the first core 53a, and the first armature magnetic pole, and the second magnetic lines G2 are generated such that they connect each circumferentially adjacent two second armature magnetic poles and the second core 53b located therebetween, and connect each circumferentially adjacent two second magnetic poles and the second core 53b located therebetween. As a result, in this state, magnetic circuits as shown in FIG. 15A are formed. In this state, since the first magnetic lines G1 are linear, no magnetic forces for circumferentially rotating the first cores 53a act on the first cores 53a. Further, the two second magnetic lines G2 between the circumferentially adjacent two second armature magnetic poles and the second core 53b are equal to each other in the degree of bend thereof and in the total magnetic flux amount. Similarly, the two second magnetic lines G2 between the circumferentially adjacent two second magnetic poles and the second core 53b are equal to each other in the degree of bend thereof and in the total magnetic flux amount. As a consequence, the second magnetic lines G2 are balanced. Therefore, no magnetic forces for circumferentially rotating the second cores 53b act on the second cores 53b, either.

Figure 13B:
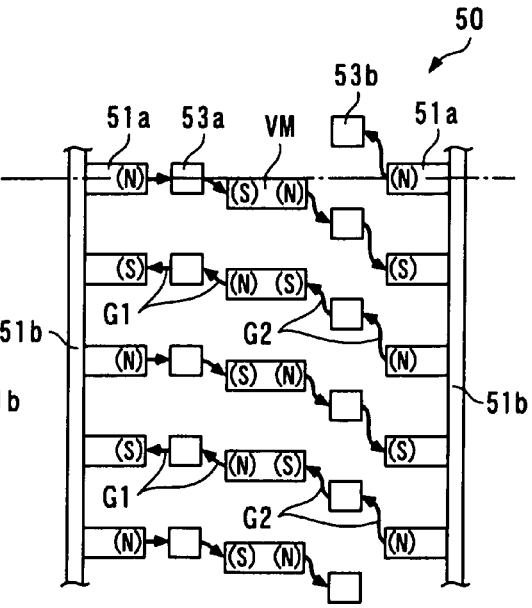
Figure 13C:
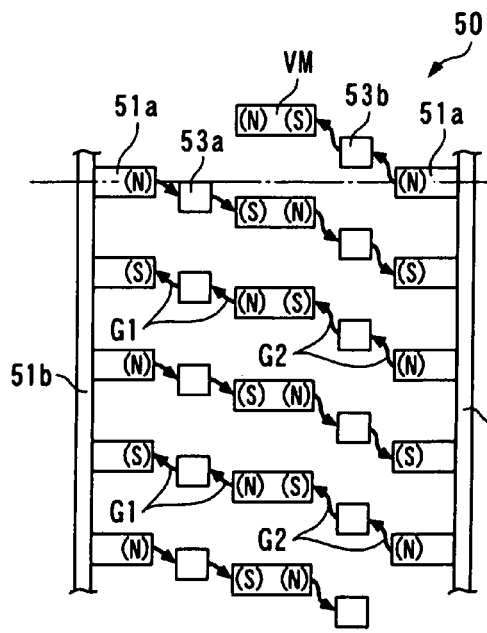
Figure 13D:
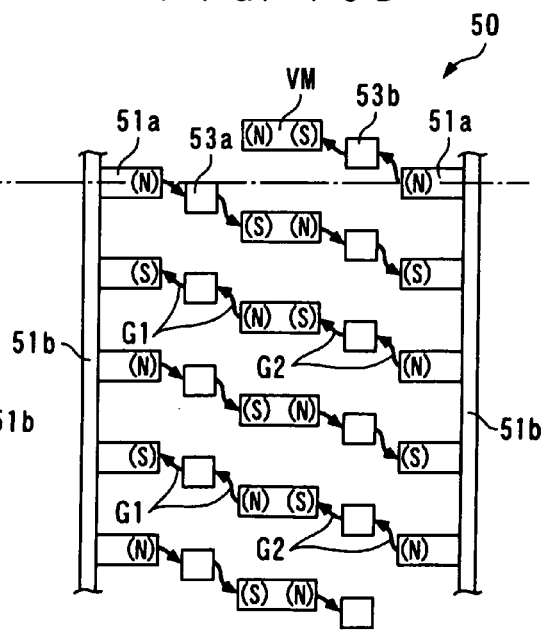
Figure 15B:
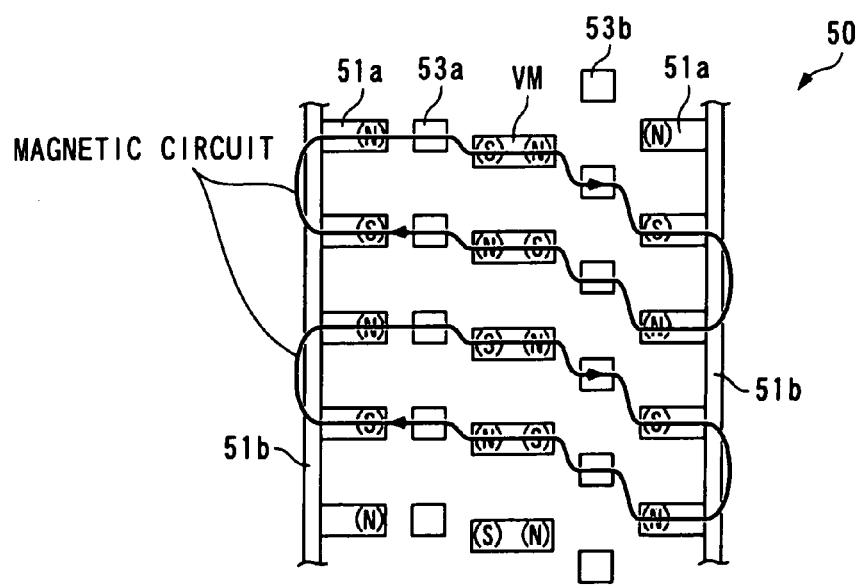

When the imaginary magnets VM rotate from a position shown in FIG. 13A to a position shown in FIG. 13B, the second magnetic lines G2 are generated such that they each connect between the second armature magnetic pole, the second core 53b, and the second magnetic pole, and the first magnetic lines G1 between the first cores 53a and the first armature magnetic poles are bent. As a result, magnetic circuits are formed by the first magnetic lines and the second magnetic lines, as shown in FIG. 15B.

In this state, since the degree of bend of each first magnetic line G1 is small but the total magnetic flux amount thereof is large, a relatively large magnetic force acts on the first core 53a. This causes the first cores 53a to be driven by relatively large driving forces in the direction of rotation of the imaginary magnets VM, that is, the direction of rotation of the first and second magnetic fields (hereinafter referred to "the magnetic field rotation direction"), whereby the A2 rotor 53 rotates in the magnetic field rotation direction. Further, since the degree of bend of the second magnetic line G2 is large but the total magnetic flux amount thereof is small, a relatively small magnetic force acts on the second core 53b. This causes the second cores 53b to be driven by relatively small driving forces in the magnetic field rotation direction, whereby the A2 rotor 53 rotates in the magnetic field rotation direction.

Then, when the imaginary magnets VM rotate from the position shown in FIG. 13B to respective positions shown in FIGS. 13C and 13D, and FIGS. 14A and 14B, in the mentioned order, the first and second cores 53a and 53b are driven in the magnetic field rotation direction by magnetic forces caused by the first and second magnetic lines G1 and G2, whereby the A2 rotor 53 is caused to rotate in the magnetic field rotation direction. During the time, the first magnetic lines G1 increase in the degree of bend thereof but decrease in the total magnetic flux amount thereof, whereby the magnetic forces acting on the first cores 53a progressively decrease to progressively reduce the driving forces for driving the first cores 53a in the magnetic field rotation direction. Further, the second magnetic lines G2 decrease in the degree of bend thereof but increase in the total magnetic flux amount thereof, whereby the magnetic forces acting on the second cores 53b progressively increase to progressively increase the driving forces for driving the second cores 53b in the magnetic field rotation direction.

Then, while the imaginary magnets VM rotate from the position shown in FIG. 14B to the position shown FIG. 14C, the second magnetic lines G2 are bent, and the total magnetic flux amounts thereof become close to their maximum, whereby the strongest magnetic forces are caused to act on the second cores 53b to maximize the driving forces acting on the second cores 53b. After that, as shown in FIG. 14C, when the imaginary magnets VM each move to a position opposed to the first and second magnet portions, the respective polarities of the first armature magnetic pole and the first magnetic pole opposed to each other become identical to each other, and the first core 53a is positioned between circumferentially adjacent two pairs of first armature magnetic poles and first magnetic poles, each pair having the same polarity. In this state, since the degree of bend of the first magnetic line G1 is large but the total magnetic flux amount thereof is small, no magnetic force for rotating the first core 53a in the magnetic field rotation direction acts on the first core 53a. Further, second armature magnetic poles and second magnetic poles opposed to each other come to have polarities different from each other.

From this state, when the imaginary magnets VM further rotate, the first and second cores 53a and 53b are driven in the magnetic field rotation direction by the magnetic forces caused by the first and second magnetic lines G1 and G2, whereby the A2 rotor 53 rotates in the magnetic field rotation direction. At this time, while the imaginary magnets VM rotate to the position shown FIG. 13A, inversely to the above, since the first magnetic lines G1 decrease in the degree of bend thereof but increase in the total magnetic flux amount thereof, the magnetic forces acting on the first cores 53a increase to increase the driving forces acing on the first cores 53a. On the other hand, since the second magnetic lines G2 increase in the degree of bend thereof but decrease in the total magnetic flux amount thereof, the magnetic forces acting on the second cores 53b decrease to reduce the driving force acing on the second core 53b.

As described above, the A2 rotor 53 rotates in the magnetic field rotation direction, while the driving forces acting on the respective first and second core 53a and 53b repeatedly increase and decrease by turns in accordance with the rotations of the imaginary magnets VM, that is, the rotations of the first and second rotating magnetic fields. In this case, assuming that the torques transmitted via the first and second cores 53a and 53b are designated by T53a and T53b, the relationship between the torque TRA2 transmitted to the A2 rotor 53 (hereinafter referred to as "the A2 rotor transmission torque"), and the two torques T53a and T53b is as shown generally in FIG. 16. As shown in the figure, the two torques T53a and T53b change approximately sinusoidally at the same repetition period, and phases thereof are displaced from each other by a half period. Further, since the A2 rotor 53 has the first and second core 53a and 53b connected thereto, the A2 rotor transmission torque TRA2 is equal to the sum of the two torques T53a and T53b that change as described above, and becomes approximately constant.

Further, the magnetic forces produced according to the first and second magnetic lines G1 and G2 act to cause the A2 rotor 53 to rotate while maintaining a state in which the first cores 53a are positioned at intermediate locations between the first magnetic poles and the first armature magnetic poles connected by the first magnetic lines G1, and at the same time the second cores 53b are positioned at intermediate locations between the second magnetic poles and the second armature magnetic poles connected by the second magnetic lines G2. Therefore, between the rotational speed NMF1 of the first and second rotating magnetic fields (hereinafter referred to as "the first magnetic field rotational speed"), the rotational speed NRA1 of the A1 rotor 51 (hereinafter referred to as "the A1 rotor rotational speed"), and the rotational speed NRA2 of the A2 rotor 53 (hereinafter referred to as "the A2 rotor rotational speed"), there holds the following equation (24):

$$NRA2=(NMF1+NRA1)/2 \quad (24)$$

By changing the equation (24), there is obtained the following equation (25):

$$NMF1-NRA2=NRA2-NRA1 \quad (25)$$

As is clear from these equations (24) and (25), the A2 rotor rotational speed NRA2 is equal to the average speed of the first magnetic field rotational speed NMF1 and the A1 rotor rotational speed NRA1. In other words, the difference between the first magnetic field rotational speed NMF1 and the A2 rotor rotational speed NRA2 is equal to the difference between the A2 rotor rotational speed NRA2 and the A1 rotor rotational speed NRA1. Thus, the first magnetic field rotational speed NMF1, the A1 rotor rotational speed NRA1, and the A2 rotor rotational speeds NRA2 are in a collinear relationship.

Figure 17A:
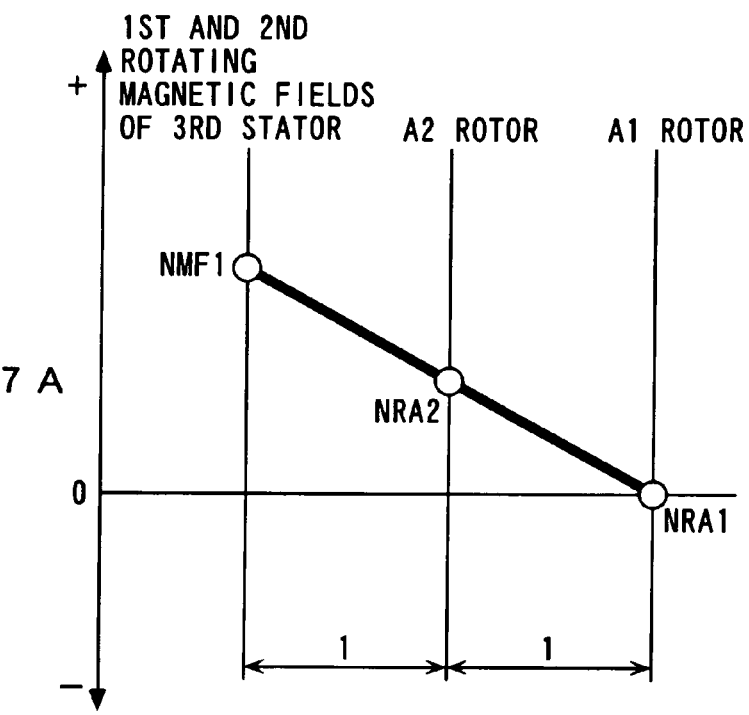
FIG. 17A is a collinear chart illustrating an example of the relationship between the first magnetic field rotational speed and the A1 and A2 rotor rotational speeds, in the case of the first rotor being made unrotatable.

As described above, when the aforementioned A1 rotor rotational speed NRA1 is equal to a value of 0, NRA2=NMF/2 holds, and a collinear chart representing the relationship between the first magnetic rotational speed NMF1, the A1 rotor rotational speed NRA1, and the A2 rotor rotational speed NRA2 can be expressed as shown in FIG. 17A. As mentioned above, since the difference between the first magnetic field rotational speed NMF1 and the A2 rotor rotational speed NRA2 is equal to the difference between the A2 rotor rotational speed NRA2 and the A1 rotor rotational speed NRA1, in the collinear chart shown in FIG. 17A, a ratio between the distance between the first rotating magnetic field and the A1 rotor 51, and the distance between the A1 rotor 51 and the A2 rotor 53 is 1:1. This is also the case with the other collinear charts expressing the relationships between the first magnetic field rotational speed NMF1, the A1 rotor rotational speed NRA1, and the A2 rotor rotational speed NRA2.

Further, in this case, the second rotor rotational speed NRA2 is reduced to ½ of the first magnetic field rotational speed NMF1, and hence, assuming that torque equivalent to the power supplied to the third stator 52 and the first magnetic field rotational speed NMF1 is a first driving equivalent torque TSE1, the A2 rotor transmission torque TRA2 becomes a twofold of the first driving equivalent torque TSE1. In short, there holds the following equation (26):

$$TRA2=2 \cdot TSE1 \quad (26)$$

As described above, when the electric power is supplied to the third stator 52 in a state where the A1 rotor 51 is made unrotatable, all the power is transmitted to the A2 rotor 53.

Next, a description will be given of an operation in the case where the first and second rotating magnetic fields are generated by the power supplied to the third stator 52, with the A2 rotor 53 made unrotatable.

Figure 19A:
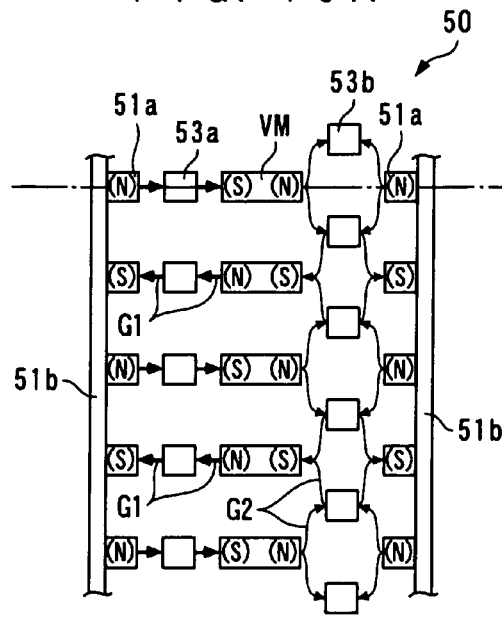
FIGS. 19A to 19D are diagrams illustrating the operation of the third rotating machine when the first and second rotating magnetic fields are generated while holding the A2 rotor unrotatable.

In this case as well, as shown in FIG. 19A, the first and second rotating magnetic fields are generated in a manner rotated downward, as viewed in the figure, from a state in which each first core 53a is opposed to each first magnet portion, and each second core 53b is in a position between each adjacent two of the second magnet portions. At the start of the generation of the first and second rotating magnetic fields, the polarity of each first armature magnetic pole is made different from the polarity of an opposed one of the first magnetic poles, and the polarity of each second armature magnetic pole is made the same as the polarity of an opposed one of the second magnetic poles. In this state, magnetic circuits as shown in FIG. 15A are formed.

Figure 19B:
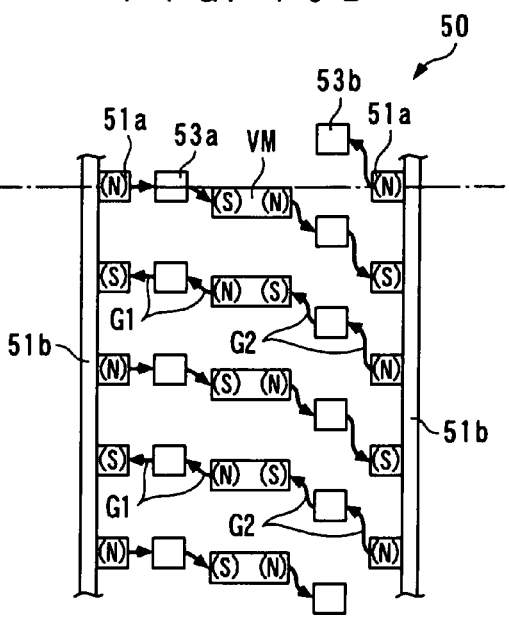

Then, when the imaginary magnets VM rotate from a position shown in FIG. 19A to a position shown in FIG. 19B, the first magnetic lines G1 between the first cores 53a and the first armature magnetic poles are bent, and accordingly, the second armature magnetic poles becomes closer to the second cores 53b, whereby the second magnetic lines G2 connecting between the second armature magnetic poles, the second cores 53b and the second magnetic poles are generated. As a consequence, magnetic circuits as shown in FIG. 19B are formed.

In this state, although the total magnetic flux amounts of the first magnetic lines G1 between the first magnetic poles and the first cores 53a are large, the first magnetic lines G1 are straight, and hence no magnetic forces are generated which cause the first magnet portions to rotate with respect to the first cores 53a. Further, although the distance between each second magnetic pole and a second armature magnetic poles having a polarity different from that of the second magnetic pole is relatively large, to make the total magnetic flux amounts of the second magnetic lines G2 between the second cores 53b and the second magnetic poles relatively small, the degree of bend of the second magnetic lines G2 is large, whereby magnetic forces that make the second magnet portions closer to the second cores 53b are caused to act on the second magnet portions. This causes the permanent magnets 51a to be driven in the direction of rotation of the imaginary magnets VM, that is, in a direction (upward, as viewed in FIG. 19) opposite to the direction of rotations of the magnetic field rotation direction, and be rotated toward a position shown in FIG. 19C. In accordance with this, the A1 rotors 51 rotate in an direction opposite to the magnetic field rotation direction.

Figure 19C:
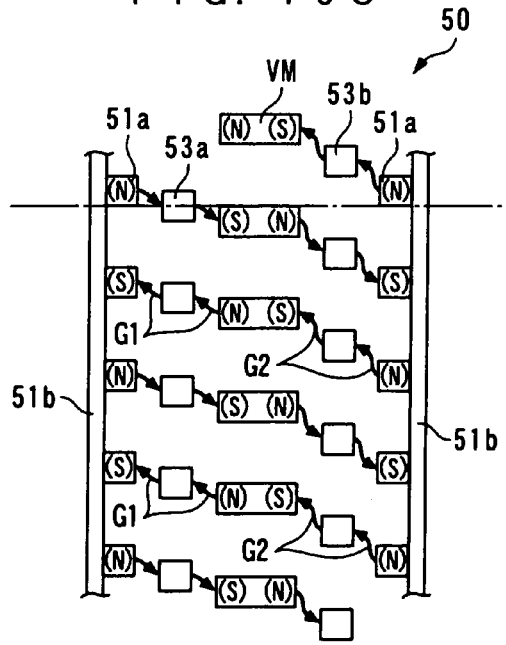
Figure 19D:
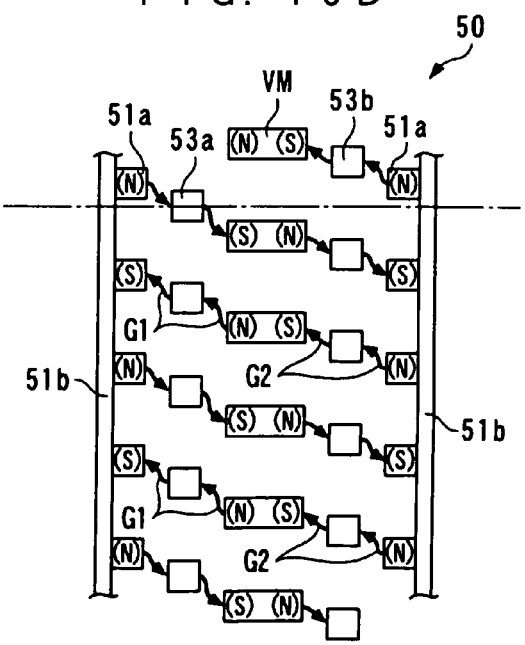

While the permanent magnets 51a rotate from the position shown in FIG. 19B toward the position shown in FIG. 19C, the imaginary magnets VM rotate toward a position shown in FIG. 19D. Thus, although the second magnet portions become closer to the second cores 53b to make the degree of bend of the second magnetic lines G2 between the second cores 53b and the second magnetic poles smaller, the imaginary magnets VM become further closer to the second cores 53b, which increases the total magnetic flux amounts of the second magnetic lines G2. As a result, in this case as well, the magnetic forces that make the second magnet portions closer to the second cores 53b act on the second magnet portions, whereby the permanent magnets 51a are driven in the direction opposite to the magnetic field rotation direction.

Further, as the permanent magnets 51a rotate in the direction opposite to the magnetic field rotation direction, the first magnetic lines G1 between the first magnetic poles and the first cores 53a are bent along with the rotation of the permanent magnets 51a, whereby magnetic forces that make the first magnet portions closer to the first cores 53a act on the first magnet portions. In this state, however, magnetic forces caused by the first magnetic lines G1 are smaller than the aforementioned magnetic forces caused by the second magnetic lines G2, since the degree of bend of the first magnetic lines G1 is smaller than that of the second magnetic lines G2. As a result, magnetic forces corresponding to the differences between the two magnetic forces drives the permanent magnets 51a in the direction opposite to the magnetic field rotation direction.

Referring to FIG. 19D, when the distance between the first magnetic poles and the first cores 53a, and the distance between the second cores 53b and the second magnetic poles have become approximately equal to each other, the total magnetic flux amount and the degree of bend of the first magnetic lines G1 between the first magnetic pole and the first core 53a become approximately equal to the total magnetic flux amount and the degree of bend of the second magnetic lines G2 between the second core 53b and the second magnetic pole, respectively. As a result, the magnetic forces caused by the first and second magnetic lines G1 and G2 are approximately balanced, whereby the permanent magnets 51a are temporarily placed in an undriven state.

Figure 20A:
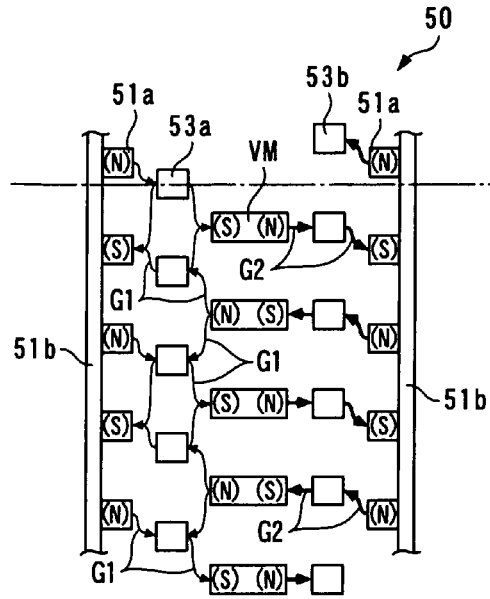
FIGS. 20A to 20C are diagrams showing a continuation of the operation in FIGS. 19A to 19D.
Figure 20B:
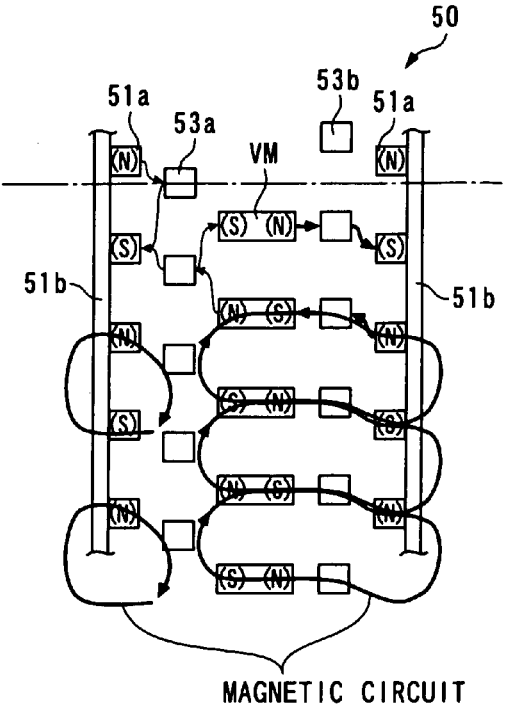

From this state, when the imaginary magnets VM rotate to a position shown in FIG. 20A, the state of generation of the first magnetic lines G1 is changed to form magnetic circuits as shown in FIG. 20B. Accordingly, the magnetic forces caused by the first magnetic lines G1 almost cease to act on the first magnet portions such that the magnetic forces make the first magnet portions closer to the first cores 53a, and therefore the permanent magnets 51a are driven by the magnetic forces caused by the second magnetic lines G2, to a position shown in FIG. 20C, in the direction opposite to the magnetic field rotation direction.

Figure 20C:
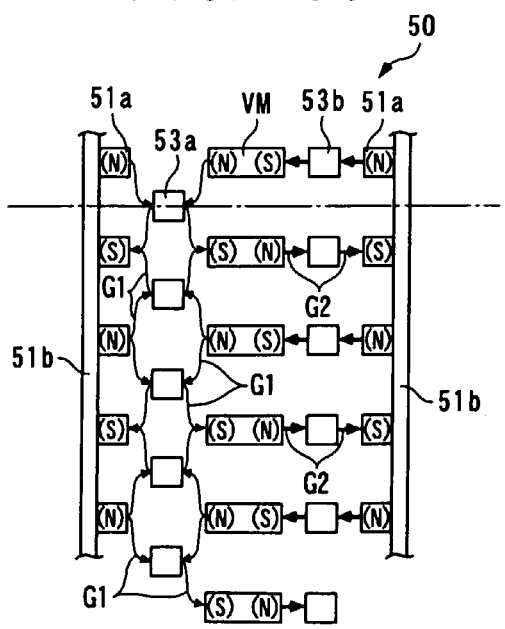

Then, when the imaginary magnets VM slightly rotate from the position shown in FIG. 20C, inversely to the above, the magnetic forces caused by the first magnetic lines G1 between the first magnetic poles and the first cores 53a act on the first magnet portions such that the magnetic forces make the first magnet portions closer to the first cores 53a, whereby the permanent magnets 51a are driven in the direction opposite to the magnetic field rotation direction, to rotate the A1 rotor 51 in the direction opposite to the magnetic field rotation direction. Then, when the imaginary magnets VM further rotate, the permanent magnets 51a are driven in the direction opposite to the magnetic field rotation direction, by respective magnetic forces corresponding to the differences between the magnetic forces caused by the first magnetic lines G1 between the first magnetic poles and the first cores 53a, and the magnetic forces caused by the second magnetic lines G2 between the second cores 53b and the second magnetic poles. After that, when the magnetic forces caused by the second magnetic lines G2 almost cease to act on the second magnet portions such that the magnetic force makes the second magnet portions closer to the first cores 53a, the permanent magnets 51a are driven by the magnetic forces caused by the first magnetic lines G1 in the direction opposite to the magnetic field rotation direction.

As described hereinabove, in accordance with the rotations of the first and second rotating magnetic fields, the magnetic forces caused by the first magnetic lines G1 between the first magnetic poles and the first cores 53a, the magnetic forces caused by the second magnetic lines G2 between the second cores 53b and the second magnetic poles, and the magnetic forces corresponding to the differences between the above magnetic forces alternately act on the permanent magnets 51a, i.e. on the A1 rotor 51, whereby the A1 rotor 51 is rotated in the direction opposite to the magnetic field rotation direction. Further, the magnetic forces, that is, the driving forces thus act on the A1 rotor 51 alternately, whereby the torque TRA1 transmitted to the A1 rotor 51 (hereinafter referred to as "the A1 rotor transmission torque") is made approximately constant.

Figure 17B:
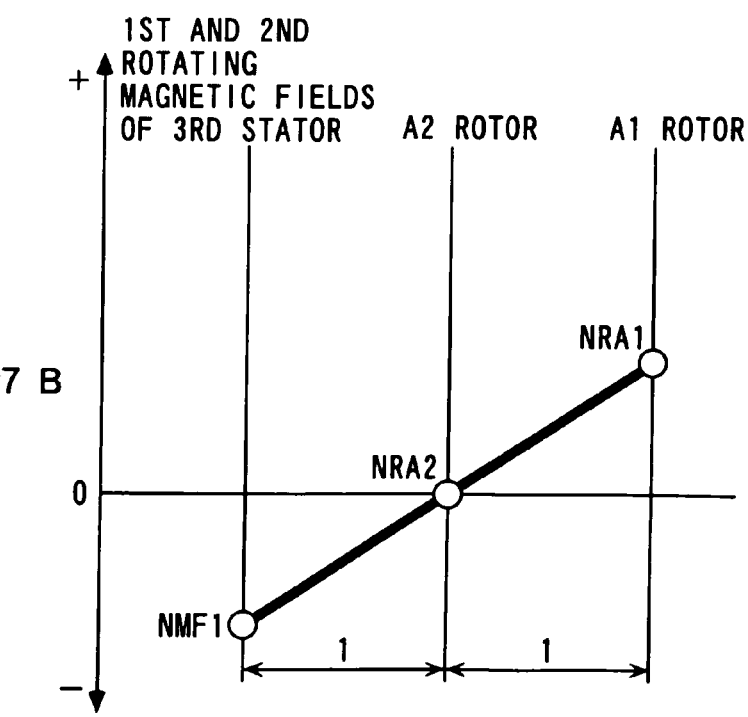
FIG. 17B is a collinear chart illustrating an example of the relationship between the first magnetic field rotational speed and the A1 and A2 rotor rotational speeds, in the case of the A2 rotor being made unrotatable.

Further, the relationship between the first magnetic field rotational speed NMF1 at this time and the rotational speeds NRA1 and NRA2 of the A1 and A2 rotors can be expressed as NRA1=−NMF1 by setting NRA2=0 in the aforementioned equation (24), and is shown, e.g. as in FIG. 17B. Thus, the A1 rotor 51 rotates in the reverse direction at the same speed as that of the first and second rotating magnetic fields. Further, in this case, the A1 rotor transmitting torque TRA1 becomes equal to the first driving equivalent torque TSE1, and there holds the following equation (27):

$$TRA1 = TSE1 \tag{27}$$

Figure 18A:
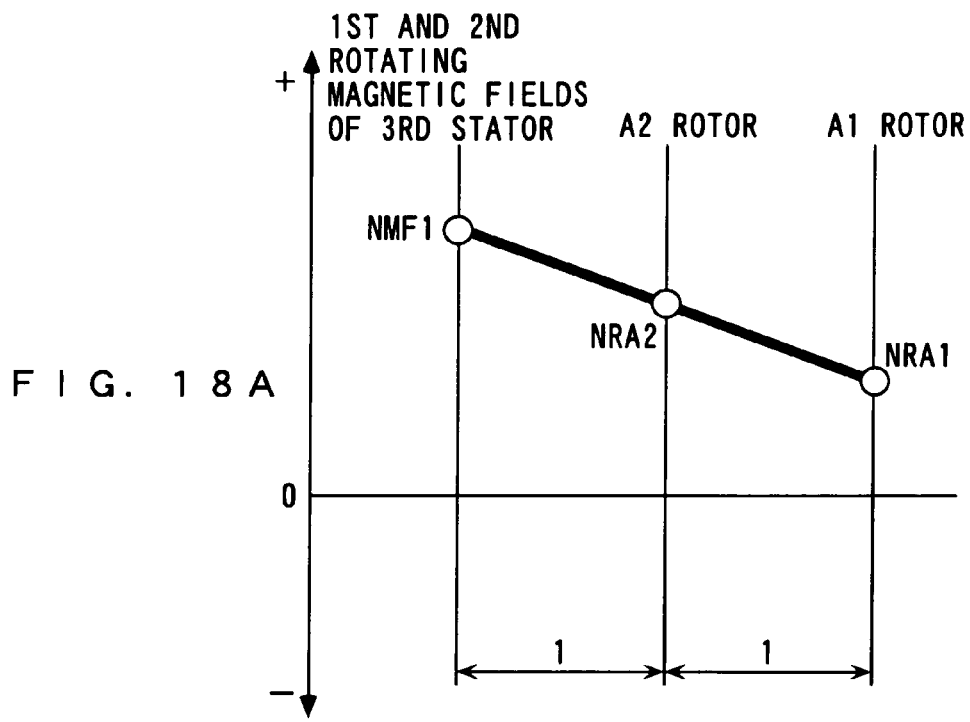
FIG. 18A is a collinear chart illustrating an example of the relationship between the first magnetic field rotational speed and the A1 and A2 rotor rotational speeds, in the case of both the A1 and A2 rotors being rotating.

Further, if none of the first magnetic field rotational speed NMF1 and the A1 and A2 rotor rotational speeds NRA1 and NRA2 are equal to 0, e.g. if the first and second rotating magnetic fields are generated in a state in which the A1 and A2 rotors 51 and 53 are caused to rotate by inputting power thereto, the relationship of the aforementioned general formula (24) is satisfied as it is and the velocity relationship between the three is expressed as shown in FIG. 18A.

Further, if the A2 rotor 53 is rotated by input of power, and the first magnetic field rotational speed NMF1 is controlled to a value of 0, the power (energy) input to the A2 rotor 53 is not transmitted to the third stator 52, but is all transmitted to the A1 rotor 51 via the magnetic forces caused by the first and second magnetic lines G1 and G2. Similarly, by causing the A1 rotor 51 to rotate by input of power, and the first magnetic field rotational speed NMF1 is controlled to a value of 0, the power (energy) input to the A1 rotor 51 is not transmitted to the third stator 52 but all transmitted to the A2 rotor 53 via the magnetic forces caused by the first and second magnetic lines of force G1 and G2.

Figure 18B:
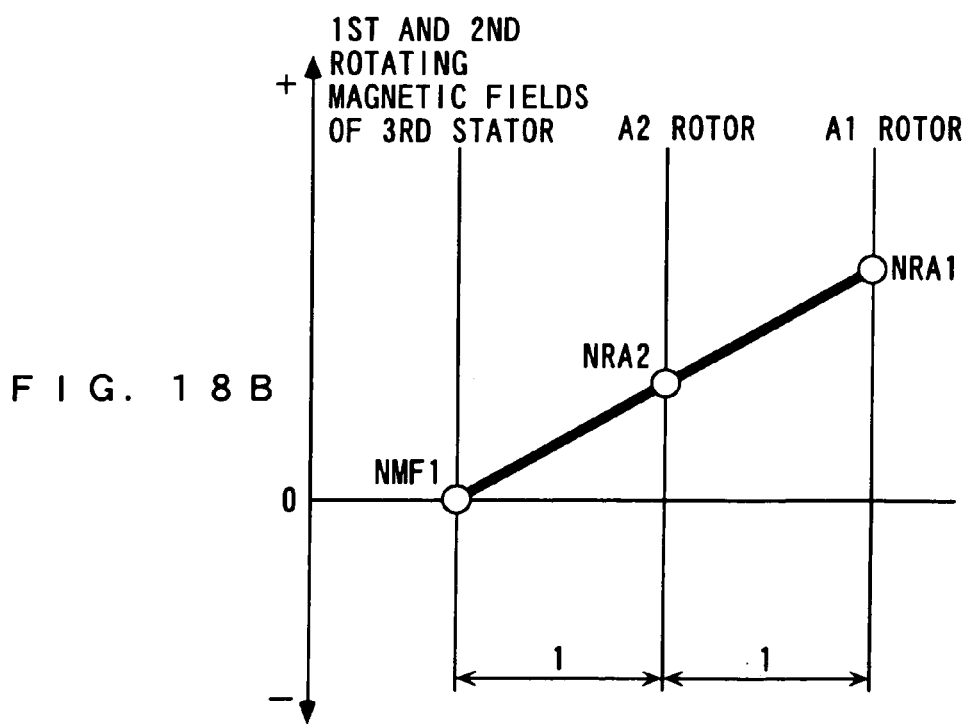
FIG. 18B is a collinear chart illustrating an example of the relationship between the first magnetic field rotational speed and the A1 and A2 rotor rotational speeds, in the case of the first magnetic field rotational speed being equal to 0.

Further, the relationship between the first magnetic field rotational speed NMF1, the A1 rotor rotational speed NRA1, and the A2 rotor rotational speed NRA2 is expressed as NRA1=2·NRA2 by setting NMF1=0 in the aforementioned equation (24), and is expressed, e.g. as shown in FIG. 18B. Further, the relationship between the A1 and A2 rotor transmitting torques TRA1 and TRA2 satisfy the following equation (28):

$$TRA1 = TRA2/2 \tag{28}$$

Further, in the third rotating machine 50, even in the case of electric power being not supplied to the third stator 52, induced electric motive force is generated in the armatures 52a to generate electric power, if with respect to the armatures 52a, the permanent magnets 51a are rotated by input of power to the A1 rotor 51 or the first and second cores 53a and 53b are rotated by input of power to the A2 rotor 53. If the first and second magnetic rotating fields are generated in accordance with this electric power generation, the aforementioned equation (24) holds.

Further, between the first magnetic field rotational speed NMF1, the A1 rotor rotational speed NRA1, and the A2 rotor rotational speed NRA2, the relationship as expressed by the aforementioned equations (24) and (25) and FIGS. 17A, 17B, and 18A, 18B is always satisfied, and the velocity relationship between the three corresponds to the velocity relationship between one and the other of the ring gear and sun gear of the planetary gear unit, and the carrier supporting the planetary gears. Further, such a velocity relationship is obtained not only during the supply of electric power to the third stator 52, but also during the generation of electric power, and hence the third rotating machine 50 can be regarded as a planetary gear unit which inputs and outputs torque by the A1 and A2 rotors 51 and 53 and inputs and outputs electric power by the third stator 52.

Further, if power is supplied to the A1 rotor 51 and at the same time electric power is supplied to the third stator 52, the first driving equivalent torque TSE1 output from the third stator 52 and the A1 rotor transmitting torque TRA1 input to the A1 rotor 51 are combined and is transmitted to the A2 rotor 53 as the A2 rotor transmitting torque TRA2. That is, the relationship between the first driving equivalent torque TSE1 and the A1 rotor transmitting torque TRA1, and the A2 rotor transmitting torque TRA2 satisfies the following equation:

$$TRA2 = TSE1 + TRA1 \tag{29}$$

However, in this case, as shown in the aforementioned equation (25), the difference between the first magnetic field rotational speed NMF1 and the A2 rotor rotational speed NRA2 and the difference between the A2 rotor rotational speed NRA2 and the A1 rotor rotational speed NRA1 are equal to each other, and hence the torque combination ratio between the first driving equivalent torque TSE1 and the A1 rotor transmitting torque TRA1 is 1:1. Therefore, the combination ratio of energy (power and electric power) is equal to the ratio between the A1 rotor rotational speed NRA1 and the first magnetic field rotational speed NMF1.

Further, if power is input to the A2 rotor 53 and at the same time, the power generation is performed by the third stator 52 using the power, assuming that torque equivalent to the electric power generated by the third stator 52 and the first magnetic field rotational speed NMF1 is defined as the first power-generating equivalent torque TGE1, the relationship between the first power-generating equivalent torque TGE1, and the A1 rotor transmitting torque TRA1, and the A2 rotor transmitting torque TRA2 satisfy the following equation (30):

$$TRA2 = TGE1 + TRA1 \tag{30}$$

In this case, as is clear from the equation (30), the A2 rotor transmitting torque TRA2 is divided and is output as the first power-generating equivalent torque TGE1 and the A1 rotor transmitting torque TRA1. Further, as shown in the aforementioned equation (25), the difference between the first magnetic field rotational speed NMF1 and the A2 rotor rotational speed NRA2 and the difference between the A2 rotor rotational speed NRA2 and the A1 rotor rotational speed NRA1 are equal to each other, and hence the torque dividing ratio in this case is 1:1. Therefore, the dividing ratio of energy (power and electric power) is equal to a ratio between the A1 rotor rotational speed NRA1 and the first magnetic field rotational speed NMF1.

Through the control of the first PDU 22, the ECU 2 controls the electric power supplied to the third stator 52 and the first magnetic field rotational speed NMF1 of the first and second rotating magnetic fields generated by the supply of electric power. Further, through the control of the first PDU 22, the ECU 2 controls the electric power generated by the third stator 52 and the first magnetic field rotational speed NMF1 of the first and second rotating magnetic fields generated by the electric power generation.

The fourth rotating machine 60 is comprised of a B1 rotor 61, a fourth stator 62 disposed in a manner opposed to the B1 rotor 61, and a B2 rotor 63 disposed between the two 61 and 62 at predetermined spaced intervals. The fourth stator 62, the B1 rotor 61, and the B2 rotor 63 are constructed similarly to the third stator 52, the A1 and A2 rotors 51 and 53, and description of details of them is omitted. Further, the fourth stator 62 is electrically connected to the battery 24 and the ECU 2 via the second PDU 23. Further, in accordance with supply or generation of electric power, the fourth stator 62 generates third and fourth rotating magnetic fields similar to the first and second rotating magnetic fields.

Further, the fourth rotating machine 60 have the same functions as those of the third rotating machine 50, and can also be regarded as a planetary gear unit which inputs and outputs torque by the B1 and B2 rotors 61 and 63 and inputs and outputs electric power by the fourth stator 62. Further, assuming that the rotational speeds of the third and fourth magnetic fields generated by the fourth stator 62 is represented by NMF2, the rotational speeds of the B1 and B2 rotors 61 and 63 by NRB1 and NRB2, between the rotational speeds NMF2, NRB1, and NRB2, there is always satisfied a relationship expressed by the aforementioned equations (24) and (25) and shown in FIGS. 17A and 17B and FIGS. 18A and 18B, both during supply of electric power to the fourth stator 62 and during generation of electric power. Therefore, there hold the following equations (31) and (32):

$$NRB2 = (NMF2 + NRB1)/2 \tag{31}$$

$$NMF2 - NRB2 = NRB2 - NRB1 \tag{32}$$

Further, the torques transmitted to the B1 and B2 rotors 61 and 63 are referred to as B1 rotor transmission TRB1 and B2 rotor transmission TRB2, and the torque equivalent to the electric power supplied to the fourth stator 62 and the second magnetic field rotational speed NMF2 is referred to as second driving equivalent torque TSE2. The torque equivalent to electric power generated by the fourth stator 62 and the second magnetic field rotational speed NMF2 is referred to as second generating equivalent torque TGE2. In this case, the relationship expressed by the aforementioned equations (26) to (30) always holds between these torques TRB1, TRB2, TSE2, and TGE2, and hence there hold the following equations:

$$TRB2 = 2 \cdot TSE2 \text{ (provided } NRB1=0, NRB2=NMF2/2) \tag{33}$$

$$TRB1 = TSE2 \text{ (provided } NRB2=0, NRB1=-NMF2) \tag{34}$$

$$TRB1 = TRB2/2 \text{ (provided } NMF2=0, NRB1=2 \cdot NRB2) \tag{35}$$

$$TRB2 = TSE2 + TRB1 \text{ (provided } TSE2=TRB1, NRB2= (NMF2+NRB1)/2) \tag{36}$$

$$TRB2 = TGE2 + TRB1 \text{ (provided } TGE2=TRB1, NRB2= (NMF2+NRB1)/2) \tag{37}$$

Further, as shown in FIG. 8, the B1 rotor 61 is connected to the first connection shaft 12, and the B2 rotor 63 is to the second and third connection shafts 13 and 14. With this arrangement, the left rear wheel WRL, the A2 rotor 53, and the B1 rotor 61 are connected to each other via the first connection shaft 12 etc. Further, the A1 rotor 51 and the B2 rotor 63 are connected to each other via the second connection shaft 13, and the B2 rotor 63 and the right rear wheel WRR are connected to each other via the third connection shaft 14 etc. That is, the A1 rotor 51, the B2 rotor 63, and the right rear wheel WRR are connected to each other.

Through the control of the second PDU 23, the ECU 2 controls the electric power supplied to the fourth stator 62 and the second magnetic field rotational speed NMF2 of the third and fourth rotating magnetic fields generated by the fourth stator 62 according to the supply of electric power thereto. Further, through the control of the second PDU 23, the ECU 2 controls the electric power generated by the fourth stator 62 and the second magnetic field rotational speed NMF2 of the third and fourth rotating magnetic fields generated by the fourth stator 62 according to the electric power generation.

Figure 9:
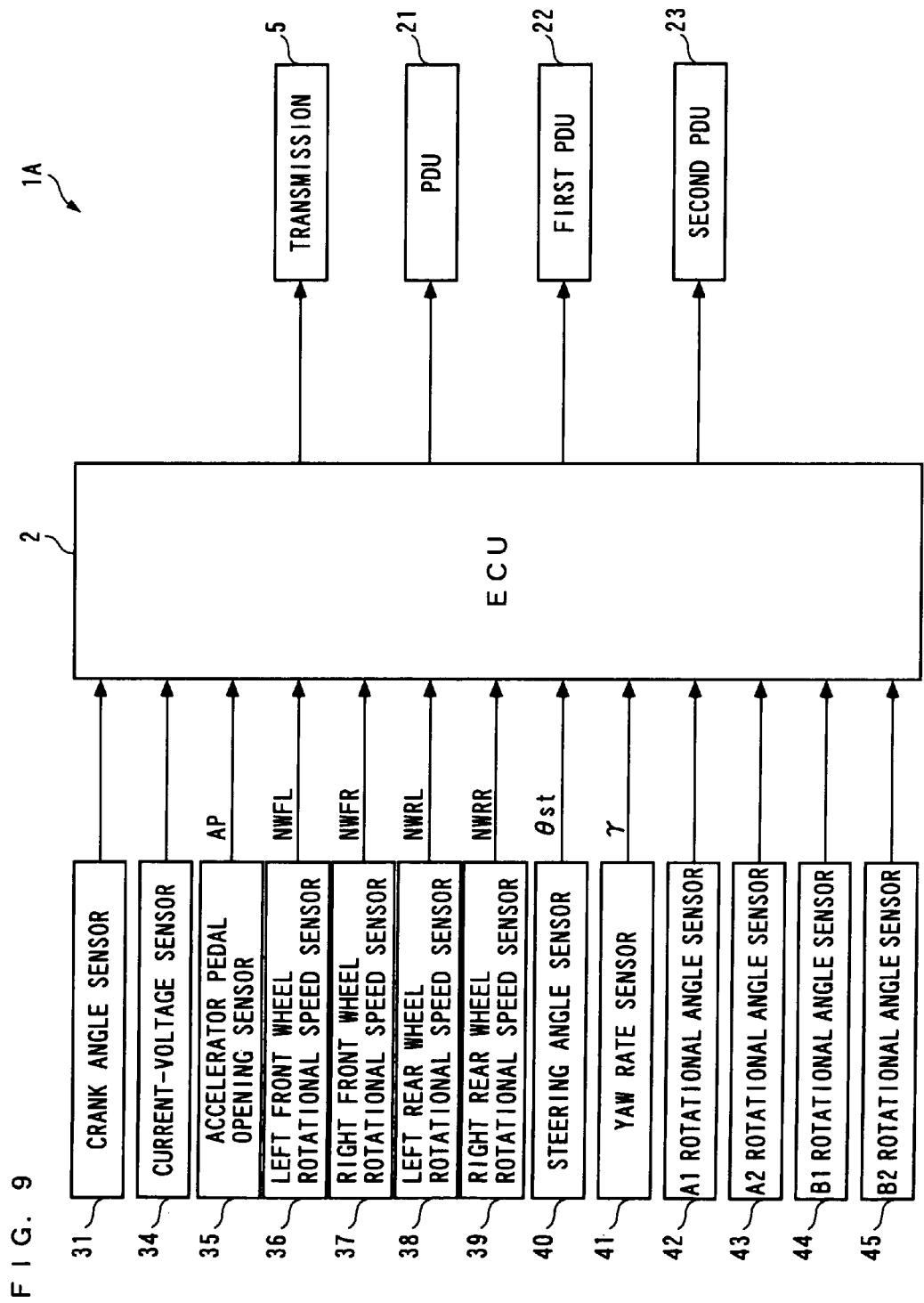
FIG. 9 is a schematic block diagram of part of the FIG. 8 power unit.

Further, as shown in FIG. 9, an A1 rotational angle sensor 42 and an A2 rotational angle sensor 43 detect the rotational angle positions of the A1 rotor 51 and the A2 rotor 53, respectively, and deliver signals indicative of the respective detected rotational angle positions to the ECU 2. The ECU 2 calculates the A1 rotor rotational speed NRA1 and the A2 rotor rotational speed NRA2, based on the detected rotational angle positions of the A1 rotor 51 and the A2 rotor 53.

Further, a B1 rotational angle sensor 44 and a B2 rotational angle sensor 45 detect the rotational angle positions of the B1 rotor 61 and the B2 rotor 63, respectively, and deliver signals indicative of the respective detected rotational angle positions to the ECU 2. The ECU 2 calculates the B1 rotor rotational speed NRB1 and the B2 rotor rotational speed NRB2, based on the detected rotational angle positions of the B1 rotor 61 and the B2 rotor 62.

Figure 21A:
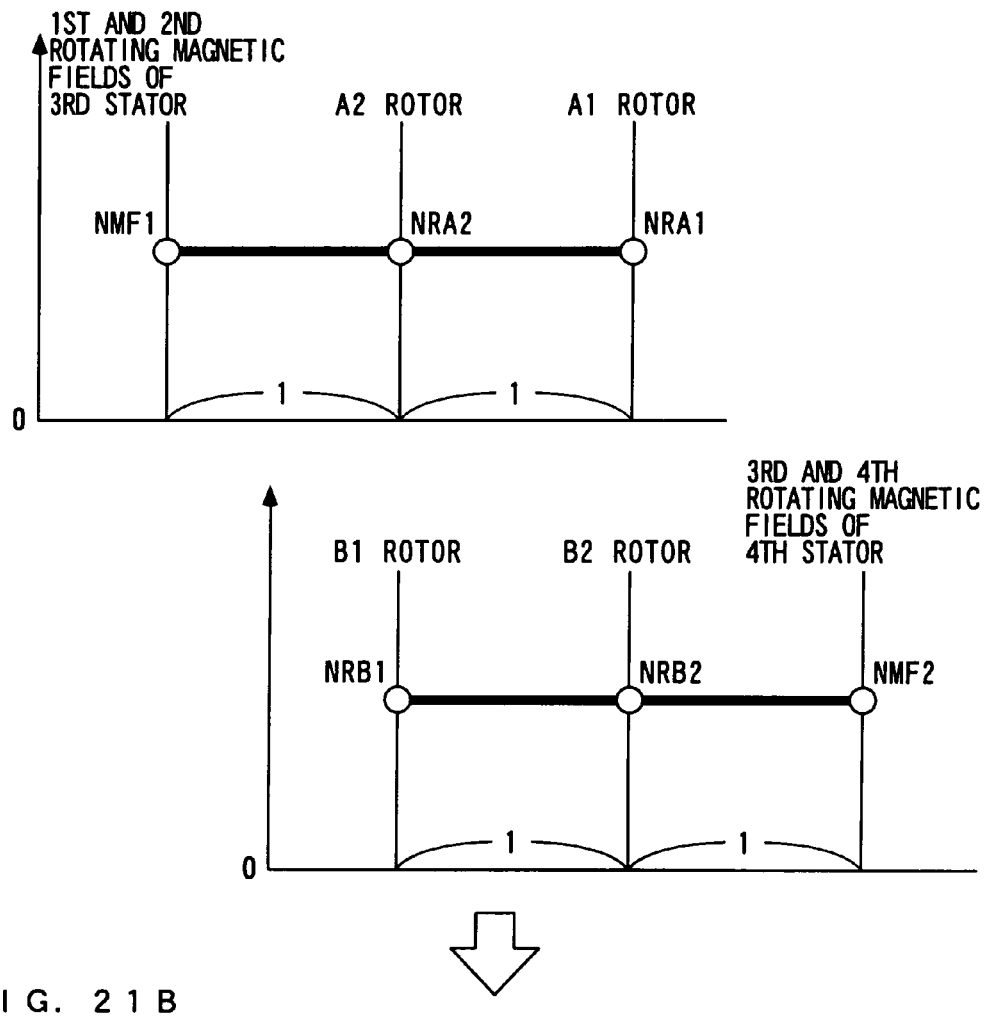
FIG. 21A is a view showing a collinear chart illustrating an example of the relationship between the respective rotational speeds of the first magnetic field, A1 rotor, and A2 rotor, together with a collinear chart illustrating an example of the relationship between the respective rotational speeds of the second magnetic field, B1 rotor, and B2 rotor.
Figure 21B:
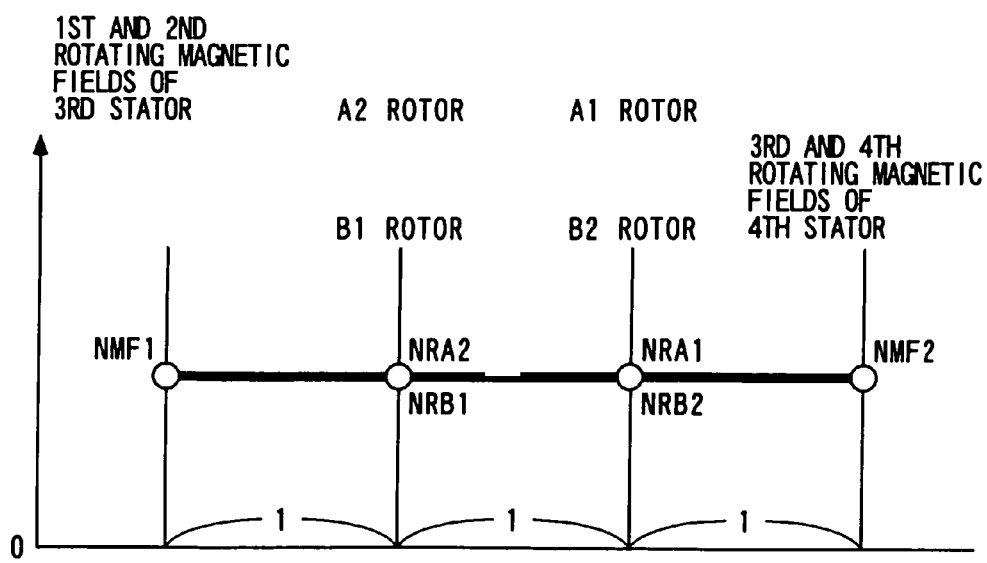
FIG. 21B is a view showing a collinear chart illustrating an example of the relationship between the respective rotational speeds of four rotary elements formed by third and fourth rotating machines.

FIG. 21A shows a collinear chart illustrating an example of the relationship between the first magnetic field rotational speed NMF1, the A1 rotor rotational speed NRA1, and the A2 rotor rotational speed NRA1, together with a collinear chart illustrating an example of the relationship between the second magnetic field rotational speed NRB1, the B1 rotor rotational speed NRB1, and the B2 rotor rotational speed NRB2. As described above, since the A2 rotor 53 and the B1 rotor 61 are connected to each other, the A2 rotor rotational speed NRA2 and B1 rotor rotational speed NRB1 are equal to each other, and since the A1 rotor 51 and the B2 rotor 63 are connected to each other, the A2 rotor rotational speed NRA2 and the B1 rotor rotational speed NRB1 are equal to each other. Therefore, the two collinear charts concerning the third and fourth rotating machines 50 and 60 shown in FIG. 21A can be represented by one collinear chart as shown in FIG. 21B. As shown in FIG. 4B, four rotary elements of which rotational speeds are in a collinear relationship with each other are formed by connecting the elements of the third and fourth rotating machines 50 and 60, as described above.

Further, as described above, since the A2 rotor 53, the B1 rotor 61, and the left rear wheel WRL are connected to each other, if a change in speed by gears and the like is ignored, the A2 rotor rotational speed NRA2, the B1 rotor rotational speed NRB1, and the left rear wheel rotational speed NWRL are equal to each other. Further, since the A1 rotor 51, the B2 rotor 63, and the right rear wheel WRR are connected to each other, if a change in speed by gears and the like is ignored, the A1 rotor rotational speed NRA1, the B2 rotor rotational speed NRB2, and the rear wheel rotational speed NWRR are equal to each other.

Figure 22:
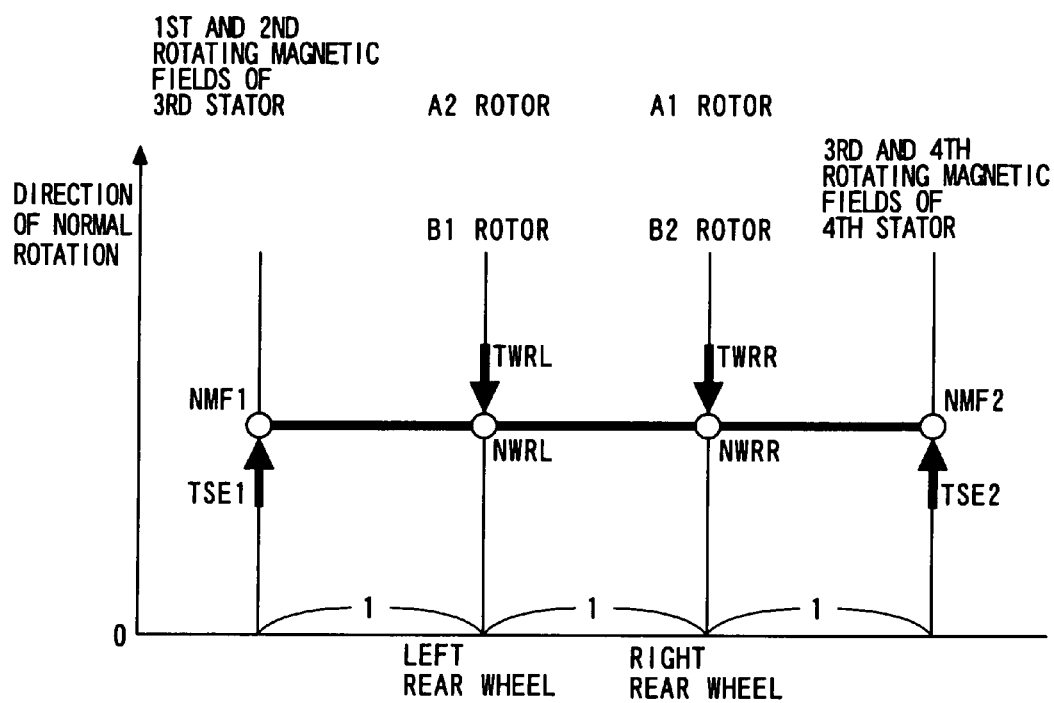
FIG. 22 is a view showing a collinear chart illustrating the relationship between the respective rotational speeds of the four rotary elements formed by the third and fourth rotating machines, the rotational speeds of the left and right rear wheels, and the rotational speeds of first and second magnetic fields, during straight traveling of the vehicle.

As described above, the relationship between the rotational speeds of the respective elements of the third and fourth rotating machines 50 and 60, and the respective rotational speeds of the left and right rear wheels NWRL and NWRR is represented by one collinear chart e.g. as shown in FIG. 22. As shown in FIG. 22, the respective rotational speeds of the first and second rotating magnetic fields, the respective rotational speeds of the left and right wheels WRL and WRR, and the respective rotational speeds of the third and fourth rotating magnetic fields are in a collinear relationship, and in the above collinear chart, they are in a line along the horizontal axis in the mentioned order. Hereafter, assuming that the direction of normal rotation of the first to fourth rotating magnetic fields is the same as the direction of normal rotation of the left and right rear wheels WRL and WRR, as to all the rotary elements of the power unit 1A, rotation in the same direction as the direction of normal rotation of the left and right rear wheels WRL and WRR is referred to as "normal rotation", and rotation in a direction opposite thereto is referred to as "reverse rotation".

Further, from the above-mentioned collinear relationship, the relationship between the first and second driving equivalent torques TSE1 and TSE2, and the left and right rear wheel transmission torques TWRL and TWRR is e.g. as shown in FIG. 22, and is represented by the following equation (38) and (39), respectively:

$$TWRL = 2 \cdot TSE1 - TSE2 \quad (38)$$

$$TWRR = 2 \cdot TSE2 - TSE1 \quad (39)$$

In the present embodiment, the A1 rotor 51 corresponds to the energy transmission device and the first rotor, the third stator 52 to the first energy input and output device and the first stator, and the A2 rotor 53 to the energy transmission device and the second rotor. Further, the B1 rotor 61 corresponds to the energy transmission device and the third rotor, the fourth stator 62 to the second energy input and output device and the second stator, the B2 rotor 63 to the energy transmission device and the fourth rotor. Further, the first and second magnetic field rotational speeds NMF1 and NMF2 correspond to the respective rotational speeds of the first and second energy input and output devices.

The power unit 1A constructed as described above, similarly to the power unit 1 in the first embodiment, operates in one of the following operation modes: a vehicle straight traveling mode, a first left turn-assisting mode, a first right turn-assisting mode, a second left turn-assisting mode, a second right turn-assisting mode, and a charge mode. Hereafter, these operation modes will be described.

Vehicle Straight Traveling Mode

In the vehicle straight traveling mode, the electric power is supplied to the third and fourth stator 52 and 62 to cause the normal rotations of the first and second rotating magnetic fields of the third stator 52 and the third and fourth rotating magnetic fields of the fourth stator 62, and the electric power supplied to the third and fourth stator 52 and 62 is controlled such that the left rear wheel transmission torque TWRL and the right rear transmission torque TWRR become equal to each other. Specifically, assuming that the left and right rear wheel transmission torques TWRL and TWRR are equal to each other in the above-mentioned equations (38) and (39), the equation TSE1=TSE2 holds. Therefore, the electric power supplied to the third and fourth stator 52 and 62 is controlled such that the first and second driving equivalent torques TSE1 and TSE2 become equal to each other. Further, the first and second rotating magnetic field rotational speeds NMF1 and NMF2 are controlled to the same value.

By the above control, during the vehicle straight traveling mode, similarly to the first embodiment, the left and right rear wheel transmission torques TWRL and TWRR are controlled to the same magnitude, and the left and right rear wheel rotational speeds NWRL and NWRR are controlled to the same value as shown in FIG. 22. As a consequence, the vehicle V travels forward in a straight line. Further, naturally, by causing the reverse rotations of the first to fourth rotating magnetic fields and performing the above-mentioned control of the torques and rotational speeds, the vehicle V moves rearward in a straight line.

First Left Turn-Assisting Mode

In the first left turn-assisting mode, the electric powers are supplied to the third and fourth stator 52 and 62 to cause the normal rotations of the first to fourth rotating magnetic fields, and the electric powers supplied to the third and fourth stator 52 and 62 are controlled such that the right rear wheel transmission torque TWRR becomes larger than the left rear wheel transmission torque TWRL. Specifically, assuming that the right rear transmission torque TWRR>the left rear wheel transmission torque TWRL holds in the equations (38) and (39), TSE2>TSE1 holds. Therefore, the electric powers supplied to the third and fourth stator 52 and 62 are controlled such that the second driving equivalent torque TSE2 becomes larger than the first driving equivalent torque TSE1. Further, the second magnetic field rotational speed NMF2 is controlled to be higher than that of the first magnetic field rotational speed NMF1.

Figure 23:
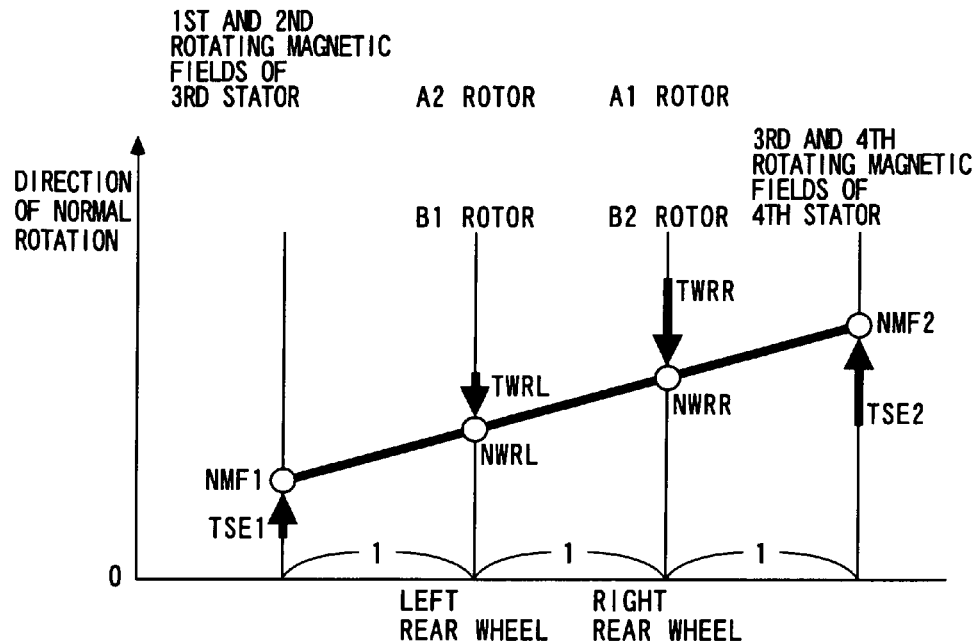
FIG. 23 is a view showing a collinear chart illustrating the relationship between the respective rotational speeds of the four rotary elements formed by the third and fourth rotating machines, the rotational speed of the left and right rear wheels, and the rotational speeds of first and second magnetic fields, during a first left turn-assisting mode.

By the above control, during the first left turn-assisting mode, similarly to the first embodiment, the right rear wheel transmission torque TWRR becomes larger than the left rear wheel transmission torque TWRL, and the right rear wheel rotational speed NWRR becomes higher than the left rear wheel rotational speed NWRL, as shown in FIG. 23. As a consequence, the left turn of the vehicle V is assisted. Further, naturally, by causing the reverse rotations of the first to fourth rotating magnetic fields, and performing the above-mentioned control of the torques and rotational speeds, the left turn of the vehicle traveling rearward is assisted.

First Right Turn-Assisting Mode

In the first right turn-assisting mode, the electric powers are supplied to the third and fourth stator 52 and 62 to cause the normal rotations of the first to fourth rotating magnetic fields, and the electric powers supplied to the third and fourth stator 52 and 62 are controlled in a manner opposite to the first left turn-assisting mode such that the left rear wheel transmission torque TWRL becomes larger than the right rear wheel transmission torque TWRR. Specifically, the electric powers supplied to the third and fourth stator 52 and 62 are controlled such that the first driving equivalent torque TSE1 becomes larger than the second driving equivalent torque TSE2. Further, the first magnetic field rotational speed NMF1 is controlled to be higher than the second magnetic field rotational speed NMF2.

Figure 24:
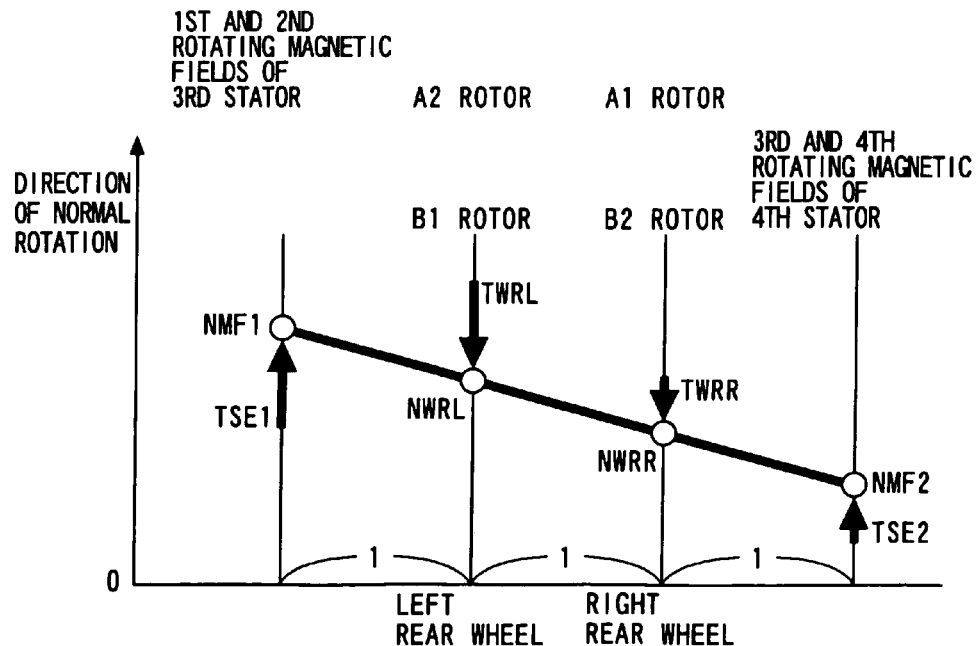
FIG. 24 is a view showing a collinear chart illustrating the relationship between the respective rotational speeds of the four rotary elements formed by the third and fourth rotating machines, the rotational speed of the left and right rear wheels, and the rotational speeds of first and second magnetic fields, during a first right turn-assisting mode.
Figure 25:
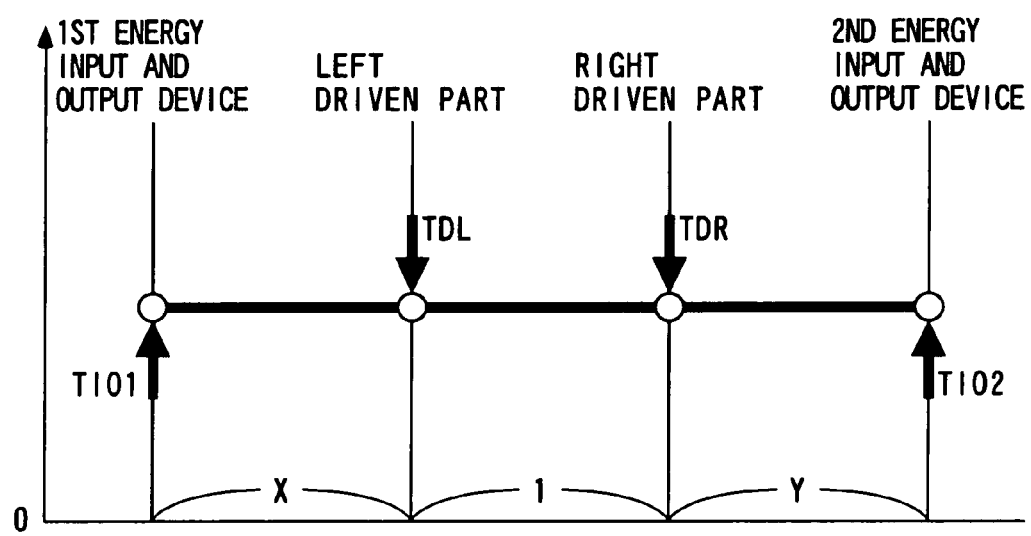
FIG. 25 is a view showing a collinear chart illustrating the relationship between the respective rotational speeds of left and right driven parts and first and second energy input and output devices, during straight traveling of a transport machine.
Figure 26:
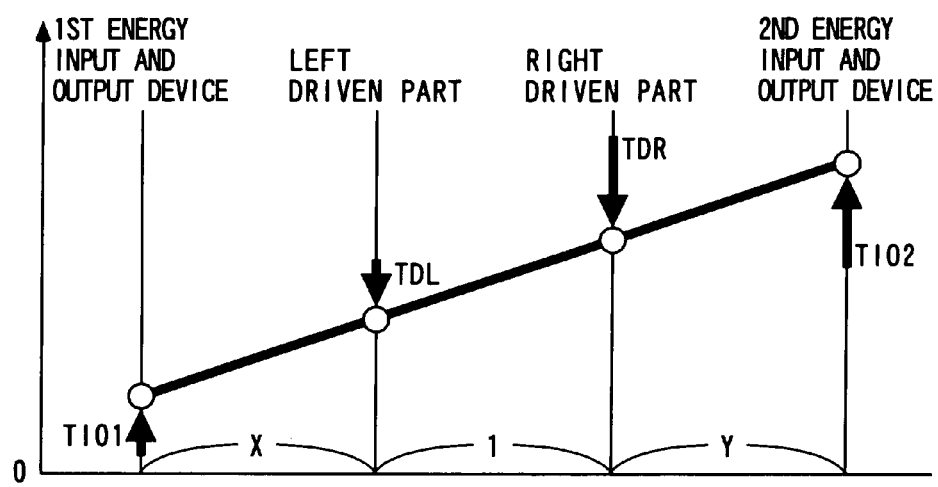
FIG. 26 is a view showing a collinear chart illustrating the relationship between the respective rotational speeds of left and right driven parts and first and second energy input and output devices, during a left turn-assisting mode of the transport machine.
Figure 27:
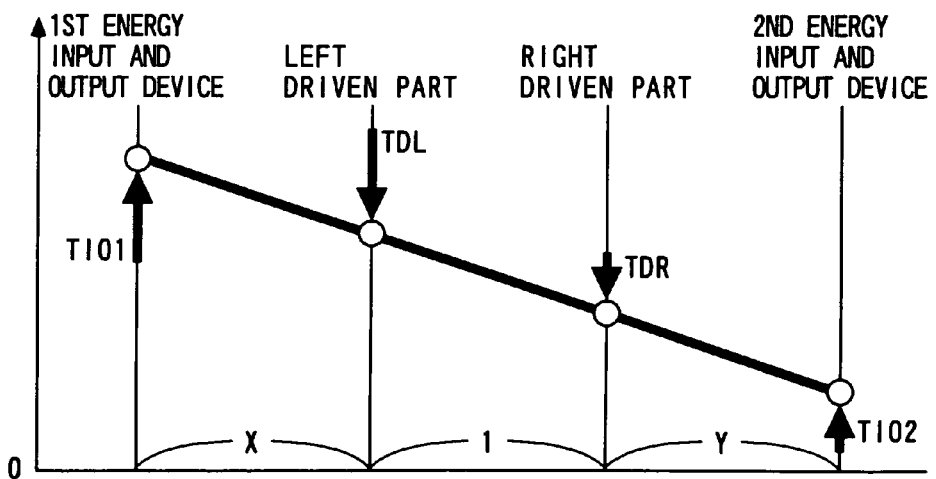
FIG. 27 is a view showing a collinear chart illustrating the relationship between the respective rotational speeds of left and right driven parts and first and second energy input and output devices, during a right turn-assisting mode of the transport machine.
Figure 28:
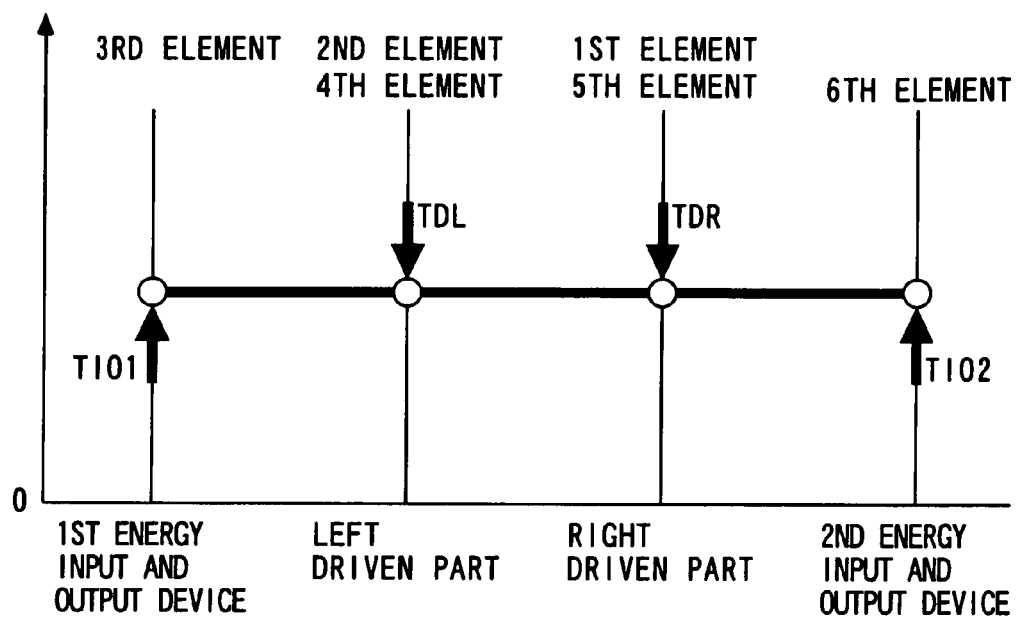
FIG. 28 is a collinear chart illustrating an example of the relationship between the respective rotational speeds of first to sixth elements, left and right driven parts, and the first and second energy input and output devices.
Figure 29:
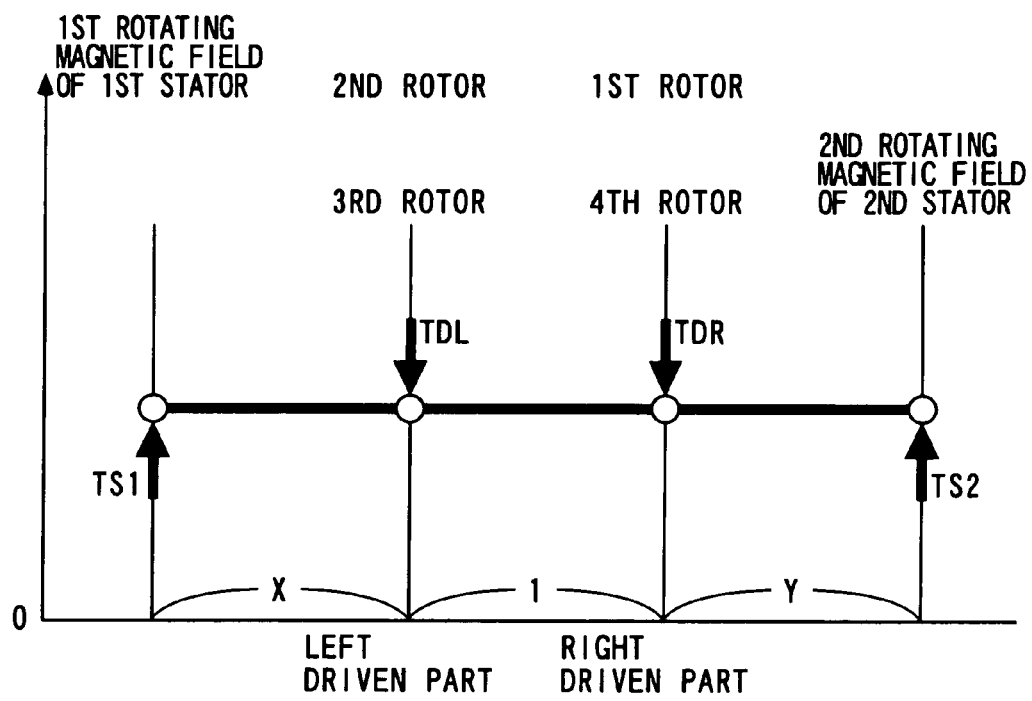
FIG. 29 is a collinear chart illustrating the relationship between the respective rotational speeds of the left and right driven parts, first to fourth rotors, and first and second rotating magnetic fields, during straight traveling of the transport machine.

By the above control, in the first right turn-assisting mode, similarly to the first embodiment, the left rear wheel transmission torque TWRL becomes larger than the right rear wheel transmission torque TWRR, and as shown in FIG. 24, the left rear wheel rotational speed NWRL becomes higher than the right rear wheel rotational speed NWRR. As a consequence, the right turn of the vehicle V is assisted. Further, naturally, by causing the reverse rotations of the first to fourth rotating magnetic fields, and controlling the above-mentioned control of the torques and rotational speeds, the right turn of the vehicle travelling rearward is assisted. It should be noted that during the first left and right turn-assisting modes, similarly to the first embodiment, the above-mentioned control of the torques and rotational speeds is performed according to the steering angle θst, the vehicle speed VP, and the yaw rate γ.

Further, in the vehicle straight traveling mode and the first left and right turn-assisting modes, similarly to the first embodiment, the electric power of the battery 24 and/or the electric power generated by the rotating machine 4 are/is supplied to the first and second rotating machines 10 and 11.

As described above, similarly to the first embodiment, it is possible to assist the vehicle V in traveling in a line or performing a left or right turn, without using the brakes. Therefore, the omission of these brakes makes it possible to reduce the size and manufacturing costs of the power unit 1A. Further, as is apparent from comparison between the aforementioned equations (1) and (2) and the equations (38) and (39), by controlling the first and second driving equivalent torques TSE1 and TSE2, the torque difference between the left and right rear wheels WRL and WRR can be controlled to a value larger than the maximum torques of the first and second driving equivalent torques TSE1 and TSE2, and therefore, it is possible to obtain the larger torque difference between the left and right rear wheels WRL and WRR than when the first and second rotating machines 10 and 11 the maximum torques of which are the maximum values of the first and second driving equivalent torques TSE1 and TSE2 are directly connected to the left and right rear wheels WRL and WRR. Therefore, it is possible to increase the turnability of the vehicle V.

Further, as shown in FIG. 22, in the collinear chart, the first to fourth rotating magnetic fields of the third and fourth stator 52 and 62 are positioned at outward of the left and right rear wheels WRL and WRR, respectively. This makes it possible to obtain the larger toque difference between the left and right rear wheels WRL and WRR. Therefore, it is possible to increase the turnability of the vehicle V.

Second Left Turn-Assisting Mode

In the second left turn-assisting mode, no electric power is supplied from any of the battery 24 and the rotating machine 4 to the third and fourth stator 52 and 62, but electric power is generated by the third stator 52 using the left rear wheel WRL to supply the generated electric power to the fourth stator 62, and the third and fourth rotating magnetic fields are caused to rotate in the same direction as the direction of rotations of the left and right rear wheels WRL and WRR. In this case, the relationship between the first power-generating equivalent torque TGE1, the second driving equivalent torque TSE2, and the left and right rear wheel transmission torques TWRL and TWRR is represented by the following equations (40) and (41):

$$TWRL = -2 \cdot TGE1 - TSE2 \qquad (40)$$

$$TWRR = 2 \cdot TSE2 + TGE1 \qquad (41)$$

As is apparent from these equations (40) and (41), the left and right rear wheel transmission torques TWRL and TWRR act on the left and right rear wheels WRL and WRR as negative torque and positive torque, respectively. This reduces the speed of the left rear wheel WRL and increases the speed of the right rear wheel WRR. As a consequence, the left turn of the vehicle V is assisted. It should be noted that the electric power generated by the third stator 52, and the first and second magnetic field rotational speeds NMF1 and NMF2 are controlled based on the steering angle θst, the vehicle speed VP, and the yaw rate γ.

Second Right Turn-Assisting Mode

In the second right turn-assisting mode, no electric power is supplied from any of the battery 24 and the rotating machine 4 to the third and fourth stator 52 and 62, but electric power is generated by the fourth stator 62 using the right rear wheel WRR to supply the generated electric power to the third stator 52, and the first and second rotating magnetic fields are caused to rotate in the same direction as the direction of rotations of the left and right rear wheels WRL and WRR. In this case, the relationship between the first driving equivalent torque TSE1, the second generating equivalent torque TGE2, and the left and right rear wheel transmission torques TWRL and TWRR is represented by the following equations (42) and (43):

$$TWRL = 2 \cdot TSE1 + TGE2 \qquad (42)$$

$$TWRR = -TSE1 - 2 \cdot TGE2 \qquad (43)$$

As is apparent from these equations (42) and (43), the left and right rear wheel transmission torques TWRL and TWRR act on the left and right rear wheels WRL and WRR as positive torque and negative torque, respectively. This increases the speed of the left rear wheel WRL and reduces the speed of the right rear wheel WRR. As a consequence, the right turn of the vehicle V is assisted. It should be noted that during the second right turn-assisting mode, the electric power generated by the fourth stator 62, and the first and second magnetic field rotational speeds NMF1 and NMF2 are controlled based on the steering angle θst, the vehicle speed VP, and the yaw rate γ.

As described above, in the second left turn-assisting mode and the second right turn-assisting mode, similarly to the first embodiment, it is possible to assist the left turn and right turn of the vehicle V without supplying electric power to the third and fourth stator 52 and 62 from any of the battery 24 and the rotating machine 4. Further, in the second left turn-assisting mode and the second right turn-assisting mode, since electric energy is used as the energy given and received between the third and fourth stator 52 and 62, the giving and receiving of the electric energy can be accurately controlled, which makes it possible to properly assist the left turn and the right turn of the vehicle V.

Charge Mode

In the charge mode, using the powers of the left and right rear wheels WRL and WRR, electric power is generated by the third and fourth stator 52 and 62 and the battery 24 is charged with the generated electric power. In this case, the electric powers generated by the third and fourth stator 52 and 62 are controlled such that the left and right rear wheel transmission torques TWRL and TWRR become equal to each other.

Specifically, this control is performed in the following manner: The relationship between the above-mentioned first and second power-generating equivalent torques TGE1 and TGE2 and the left and right rear wheel transmission torques TWRL and TWRR is represented by the following equations (44) and (45):

$$TWRL = TGE2 - 2 \cdot TGE1 \qquad (44)$$

$$TWRR = TGE1 - 2 \cdot TGE2 \qquad (45)$$

Further, assuming that the left and right rear wheel transmission torques TWRL and TWRR are equal to each other in the above equations (44) and (45), the equation TGE1=TGE2 holds. Therefore, the electric powers generated by the third and fourth stator 52 and 62 are controlled such that the first and second power-generating equivalent torques TGE1 and TGE2 become equal to each other. Further, the first and second magnetic field rotational speeds NMF1 and NMF2 are controlled such that they become equal to each other.

Thus, in the charge mode, the left and right rear wheel transmission torques TWRL and TWRR are controlled to the same magnitude, and the left and right rear wheel rotational speeds NWRL and NWRR are controlled to the same value. Therefore, similarly to the first embodiment, while maintaining excellent straight traveling properties of the vehicle V, it is possible to charge the battery 2 by converting the powers of the left and right rear wheels into electric power.

Further, as is apparent from the equations (44) and (45), as the above-described electric charging is performed, the decelerating torques act on the left and right rear wheels WRL and WRR from the third and fourth stator 52 and 62. Further, similarly to the first embodiment, the operation in the charge mode is performed during decelerating traveling of the vehicle V, which makes it possible to reduce load on the brake for reducing the speed of the vehicle V.

As described above, according to the above-described second embodiment, it is possible to the same advantageous effects as provided by the first embodiment. Further, as described hereinabove, the power unit 1 according to the first embodiment requires a total of four elements: the first and second rotating machines 10 and 11, and the first and second planetary gear units PS1 and PS2. In contrast, the second embodiment is only required to have a total of two elements: the third and fourth rotating machines 50 and 60, and hence compared with the first embodiment, the power unit 1A can be made by a smaller number of component parts, which make it possible to reduce the size thereof.

Further, in the case of the first embodiment, power (energy) is input and output between the first and second rotating machines 10 and 11 and the left and right rear wheels WRL and WRR via the first and second planetary gear units PS1 and PS2. This causes transmission losses due to the meshing of gears of the first and second planetary gear units PS1 and PS2. In the above-described second embodiment, however, the input and output of energy between the third stator 52, the A1 rotor 51, and the A2 rotor 53 and between the fourth stator 62, the B1 rotor 61, and the B2 rotor 63 is performed via magnetic circuits in a non-contacting manner, i.e. by so-called magnetic path. Therefore, differently from the case of using the planetary gear units, there occur no transmission losses. Therefore, it is possible to improve the driving efficiency of the left and right rear wheels WRL and WRR by the third and fourth stators 52 and 62, and the electric power-generating efficiency of the third and fourth stators 52 and 62 using the left and right rear wheels WRL and WRR.

Although in the second embodiment, the A2 rotor 53 and the B1 rotor 61 are connected to each other, and the A1 rotor 51 and the B2 rotor 63 are connected to each other, this is not limitative, but the A2 rotor 53 and the B1 rotor 61 are not necessarily required to be connected to each other insofar as they are connected to the left rear wheel WRL. Further, one of the third and fourth rotating machines 50 and 60 may be formed by a combination of a planetary gear unit and a brushless DC motor, such as the first planetary gear unit PS1 and the first rotating machine 10 in the first embodiment.

It should be note that the present invention is by no means limited to the above-described embodiments, but it can be practiced in various forms. For example, although in the above-described embodiments, the battery 24 is used, but a capacitor may be used instead of the battery 24. Further, as a controller for controlling the first to fourth rotating machines 10, 20, 50, and 60, the ECU 2, and the first and second PDUs 22 and 23 are used, they may be replaced by a combination of microcomputer and an electric circuit. Further, although in the above-described embodiments, the present invention is applied to the vehicle V by way of example, this is not limitative, but the present invention can be also applied to shipping.

It is further understood by those skilled in the art that the foregoing are preferred embodiments of the invention, and that various changes and modifications may be made without departing from the spirit and scope thereof.

What is claimed is:

1. A power unit that drives left and right driven parts for propelling a transport machine to travel in a line and turn, comprising:
   a first energy input and output device configured to input and output energy;
   a second energy input and output device configured to input and output energy; and
   an energy transmission device provided between said first energy input and output device and said second energy input and output device, and the left and right driven parts, configured to transmit energy between said first energy input and output device and the left and right driven parts, and between said second energy input and output device and the left and right driven parts, wherein said first energy input and output device, the left driven part, the right driven part, and said second energy input and output device are in a collinear relationship in respect of rotational speed, and are in a line in this order in a collinear chart representing the collinear relationship.

2. A power unit as claimed in claim 1, further comprising:
an energy storing and releasing device configured to store and release energy, and connected to said first energy input and output device and said second energy input and output device.

3. A power unit as claimed in claim 1, wherein said first and second energy input and output devices are connected to each other in a manner capable of mutually giving and receiving energy therebetween.

4. A power unit as claimed in claim 3, wherein said energy is electrical energy.

5. A power unit as claimed in claim 1, wherein said first and second energy input and output devices are rotating machines.

6. A power unit as claimed in claim 1, wherein said energy transmission device comprises:
a first energy transmission device having a first element, a second element, and a third element, said first to third elements having respective rotational speeds satisfying a collinear relationship, and configured such that said first to third elements are in a line in order in a collinear chart representing the collinear relationship; and
a second energy transmission device having a fourth element, a fifth element, and a sixth element, said fourth to sixth elements having respective rotational speeds satisfying a collinear relationship, and configured such that said fourth to sixth elements are in a line in order in a collinear chart representing the collinear relationship,
wherein said first and fifth elements are connected to the right driven part,
wherein said second and fourth elements are connected to the left driven part,
wherein said third element is connected to said first energy input and output device, and
wherein said sixth element is connected to said second energy input and output device.

7. A power unit as claimed in claim 6, wherein said first energy transmission device is a first planetary gear unit having a first sun gear, a first ring gear, and a first carrier rotatably supporting a first planetary gear in mesh with said first sun gear and said first ring gear, and wherein one and the other of said first element and said third element are said first sun gear and said first ring gear, and said second element is said first carrier, and wherein said second energy transmission device is a second planetary gear unit having a second sun gear, a second ring gear, and a second carrier rotatably supporting a second planetary gear in mesh with said second sun gear and said second ring gear, and wherein one and the other of said fourth element and said sixth element are said second sun gear and said second ring gear, and said fifth element is said second carrier.

8. A power unit as claimed in claim 7, wherein said first element is said sun gear, said third element is said first ring gear, said fourth element is said second sun gear, and said sixth element is said second ring gear.

9. A power unit as claimed in claim 1, wherein said first energy input and output device is a first stator for generating a first rotating magnetic field, said first stator being immovable, and wherein said energy input and output device is a second stator for generating a second rotating magnetic field, said second stator being immovable, wherein said energy transmission device comprises a first rotor comprising magnets and disposed in a manner opposed to said first stator, a second rotor comprising soft magnetic material members and disposed between said first stator and said first rotor, a third rotor comprising magnets and disposed in a manner opposed to said second stator, and a fourth rotor comprising soft magnetic material members and disposed between said second stator and said third rotor, and wherein said first stator, said first rotor, and said second rotor are configured to input and output energy via magnetic circuits formed between said first stator, said first rotor, and said second rotor according to generation of the first rotating magnetic field, and in accordance with input and output of the energy, the first rotating magnetic field, said first rotor and said second rotor rotate while maintaining a collinear relationship in respective rotational speed therebetween, and wherein said second stator, said third rotor, and said fourth rotor are configured to input and output energy via magnetic circuits formed between said second stator, said third rotor, and said fourth rotor according to generation of the second rotating magnetic field, and in accordance with input and output of the energy, the second rotating magnetic field, said third rotor and said fourth rotor rotate while maintaining a collinear relationship in respective rotational speed therebetween, wherein said first and second rotors are connected to the right driven part, and wherein said second and third rotors are connected to the left driven part.

* * * * *